(12) United States Patent
Santalo et al.

(10) Patent No.: US 7,752,096 B2
(45) Date of Patent: Jul. 6, 2010

(54) SYSTEM AND METHOD FOR MANAGING ACCOUNT RECEIVABLES

(75) Inventors: Albert Santalo, Pinecrest, FL (US); Ben Andrew Sardinas, Miami, FL (US); Alan Pacheco, Miami Springs, FL (US); Jihad Stephens, Miami, FL (US)

(73) Assignee: Avisena, Inc., Miami, FL (US)

( * ) Notice: Subject to any disclaimer, the term of this patent is extended or adjusted under 35 U.S.C. 154(b) by 1715 days.

(21) Appl. No.: 10/376,330

(22) Filed: Mar. 3, 2003

(65) Prior Publication Data

US 2006/0041487 A1 Feb. 23, 2006

Related U.S. Application Data

(60) Provisional application No. 60/447,739, filed on Feb. 19, 2003, provisional application No. 60/450,319, filed on Feb. 28, 2003.

(51) Int. Cl.
*G07F 19/00* (2006.01)
*G06Q 40/00* (2006.01)
*G06Q 10/00* (2006.01)

(52) U.S. Cl. ................ 705/34; 705/2; 705/4; 705/40
(58) Field of Classification Search .............. 705/30
See application file for complete search history.

(56) References Cited

U.S. PATENT DOCUMENTS

| | | | |
|---|---|---|---|
| 4,491,725 A | 1/1985 | Pritchard | |
| 4,858,121 A | 8/1989 | Barber et al. | |
| 4,987,538 A | 1/1991 | Johnson et al. | |
| 5,070,452 A | 12/1991 | Doyle, Jr. et al. | |
| 5,235,507 A | 8/1993 | Sackler et al. | |
| 5,359,509 A | 10/1994 | Little et al. | |
| 5,583,760 A | 12/1996 | Klesse | |
| 5,644,778 A | 7/1997 | Burks et al. | |
| 5,696,906 A | 12/1997 | Peters et al. | |
| 5,715,397 A | 2/1998 | Ogawa et al. | |
| 5,790,548 A | 8/1998 | Sistanizadeh et al. | |
| 5,819,228 A | 10/1998 | Spiro | |
| 5,832,460 A | 11/1998 | Bednar et al. | |
| 5,852,812 A | 12/1998 | Reeder | |
| 5,852,842 A | 12/1998 | Stern | |
| 5,884,284 A | 3/1999 | Peters et al. | |
| 5,920,847 A | 7/1999 | Kolling et al. | |
| 5,924,074 A | 7/1999 | Evans | |
| 5,933,809 A | 8/1999 | Hunt et al. | |
| 6,012,035 A | 1/2000 | Freeman, Jr. et al. | |

(Continued)

OTHER PUBLICATIONS

Bernell K. Stone; Financial managment; Autumn 1976; 5, 3; ABI/FORM Global p. 65-81.*

(Continued)

*Primary Examiner*—F. Ryan Zeender
*Assistant Examiner*—Faris Almatrahi
(74) *Attorney, Agent, or Firm*—Hunton & Williams LLP

(57) ABSTRACT

A system for managing account receivables is provided. The system comprises a rules module or engine for receiving at least one encounter from a first party and for assessing the at least one encounter based on rules associated with a payer; and a transactions module or engine for outputting at least one claim to the payer based on the rule module's assessment of the at least one encounter.

10 Claims, 22 Drawing Sheets

U.S. PATENT DOCUMENTS

| | | | |
|---|---|---|---|
| 6,023,684 | A | 2/2000 | Pearson |
| 6,052,674 | A | 4/2000 | Zervides et al. |
| 6,088,677 | A | 7/2000 | Spurgeon |
| 6,092,055 | A | 7/2000 | Owens et al. |
| 6,112,183 | A | 8/2000 | Swanson et al. |
| 6,208,973 | B1 | 3/2001 | Boyer et al. |
| 6,223,213 | B1 | 4/2001 | Cleron et al. |
| 6,341,265 | B1 | 1/2002 | Provost et al. |
| 6,343,271 | B1 | 1/2002 | Peterson et al. |
| 6,374,229 | B1 | 4/2002 | Lowrey et al. |
| 6,393,404 | B2 | 5/2002 | Waters et al. |
| 6,453,297 | B1 | 9/2002 | Burks et al. |
| 7,006,994 | B1 * | 2/2006 | Campbell et al. ............. 705/40 |
| 7,277,869 | B2 * | 10/2007 | Starkman ...................... 705/38 |
| 2001/0034618 | A1 | 10/2001 | Kessler et al. |
| 2001/0051905 | A1 * | 12/2001 | Lucas .......................... 705/29 |
| 2002/0010594 | A1 * | 1/2002 | Levine ........................... 705/2 |
| 2002/0019749 | A1 | 2/2002 | Becker et al. |
| 2002/0062224 | A1 | 5/2002 | Thorsen et al. |
| 2002/0082863 | A1 * | 6/2002 | Kleinke ......................... 705/2 |
| 2002/0120466 | A1 | 8/2002 | Finn |
| 2002/0133503 | A1 | 9/2002 | Amar et al. |
| 2003/0018496 | A1 * | 1/2003 | Hambright et al. ............. 705/2 |
| 2003/0149594 | A1 * | 8/2003 | Beazley et al. ................. 705/2 |
| 2003/0191667 | A1 * | 10/2003 | Fitzgerald et al. .............. 705/2 |
| 2003/0233321 | A1 * | 12/2003 | Scolini et al. ................. 705/40 |
| 2006/0235280 | A1 * | 10/2006 | Vonk et al. ................... 600/300 |
| 2007/0271119 | A1 * | 11/2007 | Boerger et al. ................. 705/2 |

OTHER PUBLICATIONS

Roberto Ceniceros, Business Insurance, Chicago: Aug 12, 2002, vol. 36; Iss. 32, p. T8, 2 pgs.*

Avisena, Inc.'s Website: Healing The Healing Business, <www.avisena.com>, 22 pages, Date: 2001-2002.

Communications News, Mar. 1999, vol. 36, Issue 3, p. 48.

Citrix Customer Profiles: Wyland Galleries Hawaii, pp. 1-3, date unknown.

Citrix Press Release: HealthPoint Licenses Citrix WinFrame Thin-Client/Server Software, Jun. 30, 1997, pp. 1-3.

Traeden, Jason, Standardize and upgrade mixed computing environment, Health Management Technology, vol. 20, No. 10, pp. 24-26, Nov. 1999.

Defendants' Amended Motion for Summary Judgment of Noninfringement and Invalidity, and Brief in Support filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Jun. 5, 2006.

Index of Exhibits for Defendants' Motion for Summary Judgment of Noninfringement and Invalidity, and Brief in Support filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP.

Expert Report of James D. Whicker filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Feb. 28, 2006.

Supplemental Expert Report of James D. Whicker filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T27MAP, dated Apr. 20, 2006.

Final Invalidity Contentions filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Mar. 24, 2006.

Declaration of Doug Fielding filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Sep. 15, 2005.

Brochure for ZirMed.com filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, CRNC 012509.

XirMed.com Archives filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, retrieved from the Internet at: http://secure.oregonsbest.net/cweb/xirmed/ on Apr. 8, 1999, CRNC 012533-54.

ClaimsWeb Archives filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, Designated as Confidential—Filed Conventionally and under Seal on May 24, 2006 Pursuant to Court Order (Doc.122), 012622-25.

Claim Web Feb. 19, 1999 Facsimile filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, Designated as Confidential—Filed Conventionally and under Seal on May 24, 2006 Pursuant to Court Order (Doc.122), CRNC 012626.

Product and Service Description filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, Designated as Confidential—Filed Conventionally and under Seal on May 24, 2006 Pursuant to Court Order (Doc.122), CRNC 012627-30.

ZirMed U.S. Patent Application filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, Designated as Confidential—Filed Conventionally and under Seal on May 24, 2006 Pursuant to Court Order (Doc.122), CRNC 012706-50.

ZirMed PCT Patent Application filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, Designated as Confidential—Filed Conventionally and under Seal on May 24, 2006 Pursuant to Court Order (Doc.122), CRNC 012578-621.

Declaration of Doug Fielding filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Dec. 9, 2005.

ZirMed Copyright Deposit, filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP, dated Sep. 2, 2005, CRNC 013328-82.

Abbreviated ZirMed Invalidity Chart filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T-27MAP.

Claimsnet.com SEC Filing of Dec. 11, 1998 filed Jun. 5, 2006 in the matter of *Billingnetwork Patent, Inc. v. Cerner Physician Practice, Inc. and Vitalnetworks, Inc.* in the United States District Court for the Middle District of Florida, Case No. 8:04-CV-1515-T27MAP, CRNC 011730-91.

* cited by examiner

SYSTEM AND METHOD FOR MANAGING ACCOUNT RECEIVABLES

RELATED APPLICATION INFORMATION

This application claims the benefit of provisional application No. 60/447,739, filed on Feb. 19, 2003 and provisional application No. 60/450,319, filed on Feb. 28, 2003.

FIELD OF THE INVENTION

This invention relates generally to a system and method for managing account receivables and, more particularly, to a system and method for managing account receivables using a rules engine or system, transaction engine or system, remittance processing engine or system, nightly aging engine or system, and a reimbursement management engine or system.

BACKGROUND OF THE INVENTION

Globally, the health care industry is booming. As the population ages and the demand for quality health services intensifies, many health care organizations are experiencing sustained growth and enviable profitability. Increases in technology have enhanced the ability of science to overcome traditional obstacles and have granted ready access to millions of individuals throughout the world. Economically, the health care industry can be defined as representing approximately 15% of the nation's Gross Domestic Product (GDP), or more than $1.6 trillion in annual health care expenditures.

The increased success and activity in the health care industry has presented several obstacles, however. One such obstacle concerns the difficulty with which accounts receivables are accurately and efficiently managed. Traditionally, accounts receivables in health care have been treated in a similar fashion to receivables in other industries. Specifically, receivables are aged on a monthly basis and stratified into general current, past 30 days, past 60 days, past 90 days and past 180 days categories.

What makes health care unique, however, is the existence of a third-party payer in the receivables process, namely, the insurance company, which adds an additional layer of complexity into the process. In response to this, health care receivables management systems have implemented a dual account balance structure whereby in addition to an overall account balance for a patient's account, a patient and insurance balance are also carried. The sum of these two comprises the overall account balance. The following example illustrates this method at two stages of the receivables management process. Example—Patient with PPO coverage which pays 80% of covered charges with a $15 office-visit co-payment after payment of a $300 annual deductible, of which $280 has been met:

| Date | Event | Patient Balance | Insurance Balance | Account Balance |
|---|---|---|---|---|
| | Beginning Balance (New Account) | 0 | 0 | 0 |
| Jan. 1, 2002 | Charge for Office Visit of $150 | 0 | 150 | 150 |
| Jan. 1, 2002 | Co-Payment for Office Visit of $15 | −15 | 150 | 135 |
| Feb. 15, 2002 | Insurance Payment of $76 (on approved of $120) | −15 | 74 | 59 |
| | Disallowed of $30 | −15 | 44 | 29 |
| | Applied to Deductible of $20 | 5 | 24 | 29 |
| | Applied to Co-Pay of $15 | 20 | 9 | 29 |
| | Applied to Co-Ins of $9 | 29 | 0 | 29 |

This example also illustrates the concept of a "billed amount" and "value," whereby the billed amount is the retail price of the medical practitioner and the value is the amount that is reimbursed. The reason the two are different is because the practitioner is under contract with the payer, and other payers, each at different reimbursement levels for the same procedure; however, he is forced to bill the same amount to each. This helps to distort his accounts receivable and adds tremendous confusion to the task of forecasting his true reimbursement. Because he/she is under contract, the different between amount billed and "amount approved" (i.e. value) must be written-off as a contractual adjustment and cannot be billed to the patient.

Health care receivables are further complicated through the introduction of "denials." Health care receivables are invoiced to third-party payers using both paper- and electronic-claims. These claims typically contain a number of individual charges that together represent the entirety of a patient-provider encounter. Third-party payers, however, adjudicate claims on an individual line-item basis and may therefore pay various items on a claim while denying others.

Traditionally, health care receivables management systems have made no attempt to post denials against the open receivables. Instead, they have allowed these receivables to age past 60- or 90-days before they are worked by a collector. Once a collector begins working the item, he/she must first call the third-party payer for information regarding the item and why it is still outstanding. Oftentimes, the collector waits on hold for 10 to 2 minutes before a live person attends to them. Sometimes the third-party payer informs them that the claim was never received; other times, they inform them that the claim was denied for a given reason.

Another problem with current accounts receivable management systems and methods is their failure to standardize the organization and working of payer denials. At present, for example, there are approximately 500 different reasons used by payers to deny claims. Also, current systems and methods make no distinction between how receivables are aged, e.g., insurance receivables are aged the same way as patient receivables. This presents a problem when different payers pay according to different schedules. In Florida, for example, Medicare pays in 16-21 days, Medicaid pays in 10-14 days, Blue Cross in less than 30 days and insurance companies typically pay in 45 days. This also varies depending upon whether an electronic or paper claim was submitted.

Health care collections are a particularly labor intensive process because of the level of inefficiency introduced by the third-party payers. For instance, a typical collections or eligibility telephone call may take 15 to 20 minutes due to a prolonged hold time, for example. Organization of collections items may ease the inefficiency by laying the groundwork for how collections are to take place, for example the order in which they are to be worked. Further, third-party payers deny claims for many different reasons. At present, there are approximately 500 different reasons in use. Working these one-by-one is very difficult, intrusive and inefficient.

These and other problems exist.

SUMMARY OF THE INVENTION

Accordingly, the present invention is directed to a unique system and method for managing accounts receivables that overcomes these and other drawbacks of present systems and methods. The system and method of the invention's accounts receivables management provides a unique approach to efficient and timely collection of health care accounts receivable.

It is an object of the present invention to minimize re-work and re-submission procedures.

It is another object of the present invention to minimize lost charges.

Another object of the present invention is to make an assessment of true claim value and to subsequently provide an actual forecast of collections.

Another object of the present invention is to improve compliance with the policies of various payers.

Another object of the present invention is to track (and react to) payer reimbursement and adjudication practices.

Another object of the present invention is to track and communicate to all parties involved the receivables history.

Yet another object of the present invention is to compare reimbursement amounts to pre-assessed and/or contractual values to detect underpayments.

Another object of the present invention is the creation of rules based on payer responses.

Another object of the present invention is to identify potential problem receivables (lost in mail, ignored by insurance company, pending, etc.).

Yet another objection of the present invention is to create automated responses to certain events (e.g., automatic letter generation, resubmission of claim, electronic claim status, etc.)

Another object of the present invention is to organize collection tasks.

Another object of the present invention is to organize, manage and administer multiple incidents (e.g., collection charges categorized by reason for denial) at once.

Yet another object of the present invention is to provide a system and method for documenting (historically documenting) and collecting on receivables.

Another object of the present invention is to provide a system and method for quantifying outstanding collection issues.

Another object of the present invention is to provide a system and method for permitting interaction between all parties involved in the collections process.

Another object of the present invention is to provide a mechanism for providing workflow (transfer of responsibility for any one item between all interested parties) and track progress.

Another object of the present invention is to identify past due receivables.

Yet another object of the present invention is to segregate receivables into workable categories.

Another object of the present invention is to separate receivables worked once from receivable worked more than once (more severe).

Yet another object of the invention is to automate the assignment of work to staff and client resources.

Yet another object of the invention is to track incidents and ensure that they are dealt with in a timely fashion.

Yet another object of the invention is to provide alerts and escalation paths for incidents that are not being dealt with.

Yet another object of the invention is to allow for tracking and reporting of productivity of resources for both in-house staff and clients sites.

According to one embodiment, a system for managing account receivables is provided. The comprises: a rules module or engine for receiving at least one encounter from a first party and for assessing the at least one encounter based on rules associated with a payer; and a transactions module or engine for outputting at least one claim to the payer based on the rule module's assessment of the at least one encounter.

In another embodiment, a method for managing account receivables is provided. The method comprises: inputting at least one encounter into a capture screen; transforming the at least one encounter into at least one transaction; posting the at least one transaction to a transaction table; pulling at least one charge from the at least one transaction; assembling the at least one charge; comparing the at least one charge based on client billing parameters and payer parameters; building at least one batch of the at least one charge based on payer and/or media; and outputting the at least one batch to at least one payer.

In another embodiment, a method for managing reimbursement incidents is provided. The method comprises: receiving at least one incident; and working the at least one incident based on who generated the incident, the type of incident, the type of payer, the incident reason, the available resources for working the at least one incident.

In yet another embodiment, a method for managing accounts receivables is provided. The method comprises: posting an encounter to a transaction table; processing the encounter to determine likelihood of receiving payment; presenting encounter to a payer; receiving a remittance from the payer; and posting the remittance to the transaction table.

In another embodiment, a method for processing collection incidents is provided. The method comprises: receiving at least one aged collection incident; receiving at least one new collection incident; grouping the at least one aged collection incident and the at least one new collection incident in a desired order; and working the at least one aged collection incident and the at least one new collection incident in the desired order.

In another embodiment, a method for classifying accounts receivable is provided. The method comprises: evaluating information on a receivable; determining the payer associated with the receivable; determining past payment patterns of the payer; and aging the account receivable.

In yet another embodiment, a method for validating incoming encounters is provided. The method comprises: receiving an encounter from a provider, the encounter containing information related to services rendered to a patient; evaluating the information contained in the encounter based on specified rules; determining whether the encounter is invalid; and permitting the encounter to be amended if the encounter is invalid.

In another embodiment, a method for valuing a service line or charge is provided. The method comprises: receiving at least one encounter from a provider; posting the encounter as a service line or charge; assigning a value to the service line or charge based on reimbursement information for a payer and/or provider.

In another embodiment, a method for retrieving and posting reimbursement information from a payer is provided. The method comprises: receiving at least one remittance from a payer; determining the type of remittance; validating and balancing the remittance; adding additional information relating to the remittance to enhance collection; posting the remittance, including all payments, denials, comments, remarks, memos, adjustments, instructions for subsequent payment, and any other information useful for collection; and reconciling and/or reassigning any outstanding balances based on the remittance.

In yet another embodiment, a method for creating and maintaining a global insurance library is provide. The method comprises: identifying if a new insurance information is encountered; creating the new insurance; maintaining insurance information in the library; queuing the new insurance; reviewing the new insurance information to ensure it is not a duplicate, capturing the new insurance information; and merging the new insurance information to the global insurance library to include in progress work that references reviewed insurance information.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 7 illustrates one embodiment of a screen shot viewed by a user of the reimbursement management system showing an individual incident with encounter detail;

FIG. 8 illustrates one embodiment of a screen shot viewed by a user of the reimbursement management system an individual incident with denial detail;

DETAILED DESCRIPTION OF THE INVENTION

Figure 1:
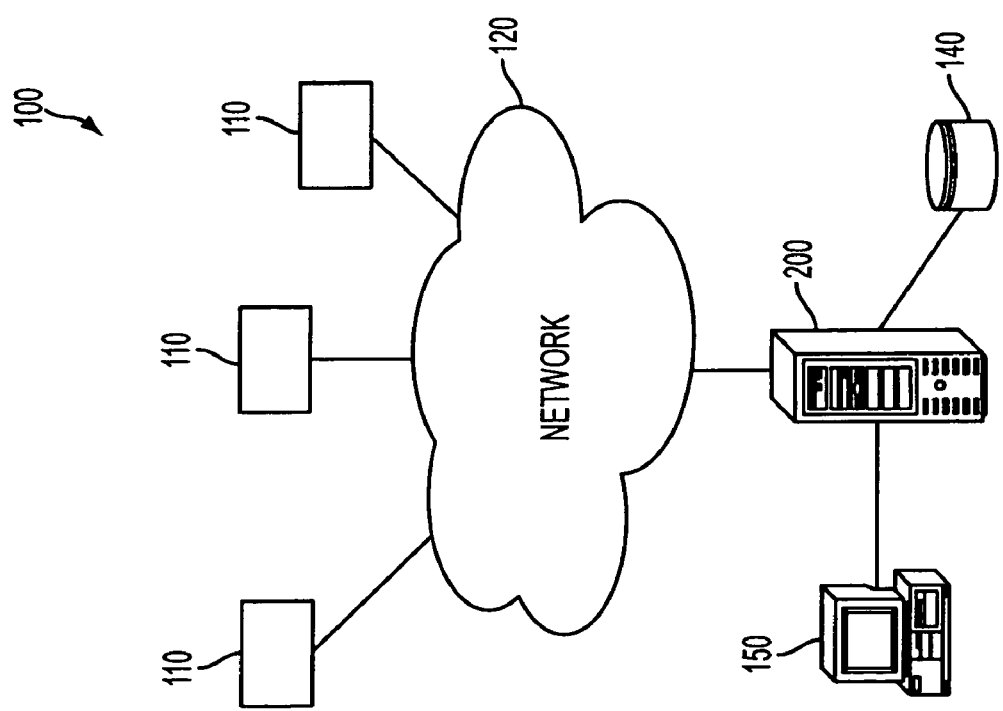
FIG. 1 illustrates one embodiment of a system 100 for managing accounts receivables of the present invention.

Reference will now be made to the present preferred embodiments of the invention, examples of which are illustrated in the accompanying drawings in which like reference characters refer to corresponding elements.

The following is a list of terms and definitions used herein:

ACLF—Adult Congregate living Facility

APPROVED AMOUNT—The customary prevailing and reasonable value of a medical procedure or service as determined by a third-party payer.

AUDITS—A request for records, charts, test results or any other information that can substantiate the medical necessity for services billed. Medicare and Medicaid frequently conduct audits on authorized providers.

AUTHORIZATION NUMBER—A number required by a specialist to treat a member of an HMO.

BCBS—Blue Cross and Blue Shield

BILLED AMOUNT—The face value of services billed to a payer.

BILLING SERVICES—Companies that work claim filings on behalf of providers and issue patient statements. These firms in general, employ manual methods and lack sophisticated audit and control mechanisms.

CAPITATION PAYMENTS—A fixed payment by an HMO to a medical provider consisting of 'X' amount of dollars per HMO member per month.

CARRIER—When payers are private commercial insurance companies they are commonly referred to as carriers.

CLAIM STATUS—The status of a Claim as it goes through the adjudication process. The claim status is usually made available by the payer to entities with enhanced information systems capabilities.

CLAIM ADJUDICATION—The payer process that checks and audits every claim, determines conformity with approved policy and determines and quantifies the outcome of a claim.

CLAIM FORM—A form demanding payment to a provider who has extended services to a patient covered by a payer's insurance program.

CMS—The Centers for Medicare and Medicaid, a US Government agency with overall responsibility for the Medicare and Medicaid programs.

CMS-1500 FORM—A claim form required by Medicare and accepted by virtually all payers.

CPT CODES—Common Procedures Terminology. A series of procedure codes and their descriptions published annually by the AMA. Required by Medicare and Medicaid and accepted by virtually all payers.

DELIVERY SYSTEMS—Manner or ways by which health care w vices are provided to the public. These systems usually have different treatment basis and different financial components.

DEMOGRAPHIC DATA—Basic information about a patient including personal data and details on insurance coverage.

DENIALS—Claims submitted to payers and returned without payment for a justifiable reason.

DIAGNOSIS CODE—The diagnostic code designation (ICD-9) for a particular disease.

ELECTRONIC REMITTANCE—Information about Claim payments and Claim denials transmitted directly from the payers computers.

ELECTRONIC FILING—A method by which Claims are filed directly from computer to computer.

ENCOUNTER—A single, separate and distinct meeting between a patient and a provider.

EOB—Explanation of Benefits. A payer form usually accompanied by a check. This form explains charges paid and charges denied.

FEE FOR SERVICES—A delivery system in the health care industry that postulates that for each service rendered there is a fair fee to be paid.

FISCAL AGENT/INTERMEDIARY—A private contractor that administers and adjudicates Claims for a payer. For example, First Coast is the fiscal agent for Medicare in Florida and ACS is the fiscal agent for Medicaid.

HMO—Health Maintenance Organization. An organization that provides health care services to its members in return for a fixed prepaid fee.

ICD-9-CM—The International Classification of Diseases by code numbers and descriptions, created by the World Health Organization. Also referred to as Diagnostic codes.

INCIDENT—A logically grouped reference to at least one charge used to drive collections workflow activities.

INCLUSIVE PROCEDURES—A procedure that for the purposes of reimbursement is not payable because it is deemed to have been performed simultaneously with another procedure.

LEDGER PROFILE—A valid grouping of insurances (payers) for a patient. These insurances are ordered in primary, secondary relationship and define specifics about how charges are billed.

VALUE—The estimated approved amount for a health care charge as determined by Avisena's proprietary method.

MEDICAID—A health insurance program for the poor. States shore in the cost of the program and determine globally consistent with federal standards.

MEDICARE—A federal health insurance program available to citizens 65 years or older and under certain circumstances to individuals under 65 years of age.

MEDIGAP—A type of insurance policy designed to pay the coinsurance or patient portion, after Medicare has paid its benefits.

NO RESPONSE—A Claim that has not been responded to by the payer in the customary amount of time.

ONLINE—A method whereby remote terminals exchange data via a telecommunications network with a central computer on an instantaneous basis.

PAID AMOUNT—The amount paid by a payer for a given charge. The result is arrived by multiplying the Approved Amount by one hundred percent minus the coinsurance percent.

PAYER—An insurance company, federal or state program that issues payments under the terms of a health insurance policy or plan. Patients may also be payers.

PERSONAL INJURY—A special case in a Claim where the illness or condition is the result of an accident.

PRIMARY CARE PHYSICIAN—A Medical Doctor providing the first encounter with a patient for treatment of an illness.

PROCEDURE-DIAGNOSIS RELATIONSHIP—Requirements that must exist between a procedure and a diagnosis in order for the procedure to be payable and considered reimbursable by a payer.

PROVIDER—A person or business providing medical services or supplies to a patient or member of an insurance plan or eligible Medicare and Medicaid recipients.

REFERRING PHYSICIAN—A physician that refers a patient to another physician for further consultation or Special Procedures.

REIMBURSEMENT ABUSE—Incidents or practices that may not be fraudulent but which are inconsistent with accepted medical, business or fiscal practices. Actively monitored by all payers.

RELATIONAL DATABASE—A group of records that are linked and related with one or more different groups of records and that can be combined, analyzed and reported as if it were one sole group of records.

RVU—Relative Value Units. A method developed at Harvard University giving each medical procedure a number of units of value, depending on difficulty, required training, location and other factors. Its use is compulsory in the Medicare program and is now widely used by private insurance companies.

SECONDARY INSURANCE—An insurance policy that pays the balance of medical expenses after the primary insurance has paid its coverage.

SERVICE LINE—A single line procedure or service (line item) for a patient performed by a provider on one date.

SPECIAL PROCEDURES—A designation for procedures involving the use of sophisticated equipment when these procedures assist physicians in making appropriate diagnosis of patient conditions. Cat-scans, MRI'S, Holters, Echocardiograms and Endoscopies are good examples. Special procedures are usually quite expensive and generally performed at hospital outpatient departments or diagnostic centers. Often contested by payers.

SUPERBILLS—A form indicating the specific procedures performed and the related diagnosis in the treatment of a patient's condition. A superbill may include Special Procedures and becomes very important in situations involving audits.

UPIN—Unique Physician Identification Number. A number assigned by Medicare to each physician. UPINs are used to keep track of physician orders for Special Procedures and of patients referred to specialists.

The present invention is described in relation to a system and method for managing account receivables associated with the health care industry. Nonetheless, the characteristics and parameters pertaining to the system and method may be applicable to managing account receivables associated with other industries and/or content.

As described herein, the system and method of the invention may generally be used in managing account receivables, particularly as it relates to managing account receivables in the health care industry. One of several technical effects of the system and method of the invention is to provide an efficient and reliable platform for working account receivables, which can be accessed and utilized by all participants (or clients) involved in traditional health care accounts receivables management, such as the provider, the insurance company (or payer), and the patient, for example. Other clients are possible, such as anyone or entity involved in the accounts receivable process.

In one embodiment, the system and method of the invention may include the maintenance of at least one financial ledger for each client that may access the system. For example, each payer which interfaces with the system may have a financial ledger stored by the system which reflects particulars of that payer's historical and current payment practices. Such information may include the types of services the payer will (or will not) pay for, what amount the payer will pay, and whether the payer will pay a maximum amount for a particular service. The financial ledger may also store other information such as the payer's running balances with providers, patients, and other providers. In another embodiment, the balances may be updated by the system and method of the invention in real time. In another embodiment, the financial ledger may store information about payer preferences, such as particular billing codes to be defined by the user, and other particular requirements or standards. In one embodiment, the financial ledger comprises a transaction table stored in a database associated with the system and method of the invention. Information stored in financial ledgers may also be used by the system and method of the invention to forecast value of charges, such as the likelihood that the charge will be collected.

The financial ledger may also store information contained in payer/provider contracts, such as the amount the payer agrees to pay for a given service or procedure, for example. This information may, in one embodiment, be inputted periodically (or in real time) by an administrator of the system and method of the invention or by the dedicated engines or systems of the invention, for example. Additional information relating to standard payment practices in the health care industry by insurance carriers—such as Medicare or Aetna™—may also be stored in a financial ledger. In one embodiment, information stored in a financial ledger may be used to organize, process, manage, and work charges, for example.

In one embodiment, the system and method of the invention may be used to input and process encounters (e.g., details about the services rendered to a patient) in an efficient and reliable manner. According to one embodiment, an encounter may include a combination of information, such as patient account data, historical clinical data, current clinical data, and parameters directly pertaining to the services rendered or performed on a specified date, for example. In another embodiment, the system and method of the invention may store encounter information in the financial ledger corresponding the client inputting the information, for example.

The system and method of the invention may also be used to provide a client, such as a provider, network, laboratory, hospital and doctor, with an estimated value or amount that it will likely receive as payment, if any, based on various variables and considerations. Examples of such variables and considerations include, but are not limited to, contractual arrangements made between payer(s) and provider(s); global variables defined by the client, such as its willingness to charge a pre-determined percentage of an established Medicare rate, for example; and, in the event particular variables are not available, defaulting to standard arrangements used by Medicare, Medicaid or other standard programs. This feature allows a client an element of predictability that is not available in prior art account receivables systems and methods. For example, if a doctor submits an encounter for services rendered to a particular patient seeking reimbursement from the payer, the system and method of the invention may inform the doctor of the likelihood that he or she will get paid, and what the amount of the payment will be likely. The data and information used by the system and method of the invention in providing the doctor with the value of his or her may be updated in real-time to ensure accuracy and reliability.

According to one embodiment, the system and method of the invention may comprise a combination of components and steps, which may include: the application of rules to encounters using a fully integrated rules engine or system supported by a robust rules knowledge base that learns from the ongoing process; real-time appraisal of receivables' value based upon published fee schedules, payer-to-provider contracts, and usual-and-customary reimbursements; posting of all responses from payers in their entirety, including denials; daily aging of all open receivables; existence of an integrated collections system reimbursement management system; and categorization of the open receivables. Other components and features are possible. In another embodiment, the engines or systems described may access and store information from and to the financial ledger as needed.

As described and claimed herein, the system and method of the invention's accounts receivables management provides a unique approach to efficient and timely collection of health care accounts receivable.

FIG. 1 illustrates one embodiment of a system 100 for managing account receivables according to the present invention. As shown, the system 100 may include a plurality of client stations 110 that may be accessed by users of system 100, such as providers, payers, patients, networks, laboratories, for example. Providers, for example, may access stations 110 to enter encounters detailing information such as patient information, services and billing information. Providers may also use station 110, ascertain the likelihood that it will successfully collect on its claim(s). Payers, for example, may access stations 110 to accept or deny claims corresponding to encounters. Alternatively, payers may pay or deny claims manually by corresponding or communicating with agents of the administrator of the system, who in turn interface with stations 110. Patients, for example, may access stations 110 to review their accounts, and/or to assess the status of pending services. An administrator of system 100 may also access stations 110 to administer, manage, coordinate, and/or update system features, data, and functionality. Collectively, users of stations 110—providers, payers, patients, etc.—may be referred to as clients of system 100. Other clients are possible. In one embodiment, a client stations 110 may be portable to provide maximum accessibility to the system 100.

Client stations 110 may include, for instance, a personal or laptop computer running a Microsoft Windows™95 operating system, a Windows™98 operating system, a Millennium™ operating system, a Windows NT™ operating system, a Windows™2000 operating system, a Windows XP™ operating system, a Windows CE™ operating system, a PalmOS™ operating system, a Unix™ operating system, a Linux™ operating system, a Solaris™ operating system, an OS/2™ operating system, a BeOS™ operating system, a MacOS™ operating system, a VAX VMS operating system, or other operating system or platform. Client stations 110 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control. Client stations 110 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client stations 110 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client stations 110 may also include a network-enabled appliance such as a WebTV™ unit, a radio-enabled Palm™ Pilot or similar unit, a set-top box, a networkable game-playing console such as a Sony™ Playstation™, Sega™ Dreamcast™ or a Microsoft™ XBox™, a browser-equipped or other network-enabled cellular telephone, or another TCP/IP client or other device.

As shown in FIG. 1, client stations 110 are connected to a communications link (or network) 120. The communications link 120 may be, include or interface to any one or more of, for instance, the Internet, an intranet, a Personal Area Network (PAN), a Local Area Network (LAN), a Wide Area Network (WAN) or a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. The communications link 120 may further include or interface to any one or more of a Wireless Application Protocol (WAP) link, a General Packet Radio Service (GPRS) link, a Global System for Mobile Communication (GSM) link, a Code Division Multiple Access (CDMA) or Time Division Multiple Access (TDMA) link such as a cellular phone channel, a Global Positioning System (GPS) link, cellular digital packet data (CDPD), a Research in Motion, Limited (RIM) duplex paging type device, a Bluetooth, BlueTeeth or WhiteTooth radio link, or an IEEE 802.11 (Wi-Fi)-based radio frequency link. The communications link 120 may further include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Also connected to the communications link 120, and thereby accessible to departments or units using stations 110, is a server station 130. In one embodiment, server station may comprise a single server or engine (as shown). In another embodiment, server station 130 may comprise a plurality of servers or engines, dedicated or otherwise, which may further host modules for performing desired system functionality. The server station 130, for example, may host one or more applications or modules that function to permit interaction between the users, as it relates to the management of account receivables. For example, the server station 130 may include an administration module that serves to permit interaction between the system and the individual(s) or entity(ies) charged with administering system 100. The server station 130 may include, for instance, a workstation or workstations running the Microsoft Windows™NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

A user may access the server station 130 via the communications link 120 using a client station 110. As was mentioned above, interaction between the system 100 of the invention and each user permits, among other things, the management of accounts receivables. Specifically, the administrator of system 100 may input, add, remove, and edit data or information, and/or enhance system functionality, for example, using an input device to station 110. Identification of a user using station 110 may be determined automatically by the system 100 based on the department or unit's IP address or other similar identifier, or may be based on log-in data or information provided by the user, such as the department or unit's predetermined user name and a password. Other information may be used to personalize the session.

Information relied on by the system 100 may be stored in a database 140, as shown in FIG. 1. The database 140 may include or interface to, for example, an Oracle™ relational database sold commercially by Oracle Corporation. Other databases, such as an Informix™ database, Database 2 (DB2) database, a Sybase™ database or another data storage or query format, platform or resource such as an On Line Analytical Processing (OLAP) data storage facility, a Standard Query Language (SQL) data storage facility, a storage area network (SAN) facility, or a Microsoft Access™ database or other similar database platform or resource. The database 140 may be supported by a server or other resources, and may include redundancy, such as a redundant array of independent disks (RAID), for data protection SAN. For example, the database 140 and the server station 130 may comprise an OLAP system that generates a plurality of user-specific reports from data maintained by the database 140. In another example, the server station 130 may be associated with or connected to a database server (not shown) that serves to present queries against the database 140. The database server may comprise an OLAP server system for accessing and managing data stored in the database 140. The database server may also comprise a Relational On Line Analytical Processing (ROLAP) engine, a Multi-dimensional On Line Analytical Processing (MOLAP) engine, or a Hybrid On Line Analytical Processing (HOLAP) engine according to different embodiments. Specifically, the database server may comprise a multithreaded server for performing analyses directly against the database 140.

Information stored in the database 140 may be input and administered by a administrator, for example, via an administration interface 150. Alternatively, the administrator may input and administrate information using stations 110. Information entered by the representative may, in one example, correspond to patient, payer and provider information, for example. Payer information may include data concerning a particular payer's historical or current payment patterns, such as the types of claims the payer categorically denies, or additional information required for reimbursement that typically would not be required by other payers. Further, the representative may also use administration module 150 to input identification information of clients, such as, for example, the IP address(es) corresponding to each client, or user name and password information. The identification information may be used by the compliance office to personalize the survey or series of questions based on the identity of the receiving department or unit. Other information may be entered. In all instances, the inputted information may be stored and updated, as necessary.

Figure 2:
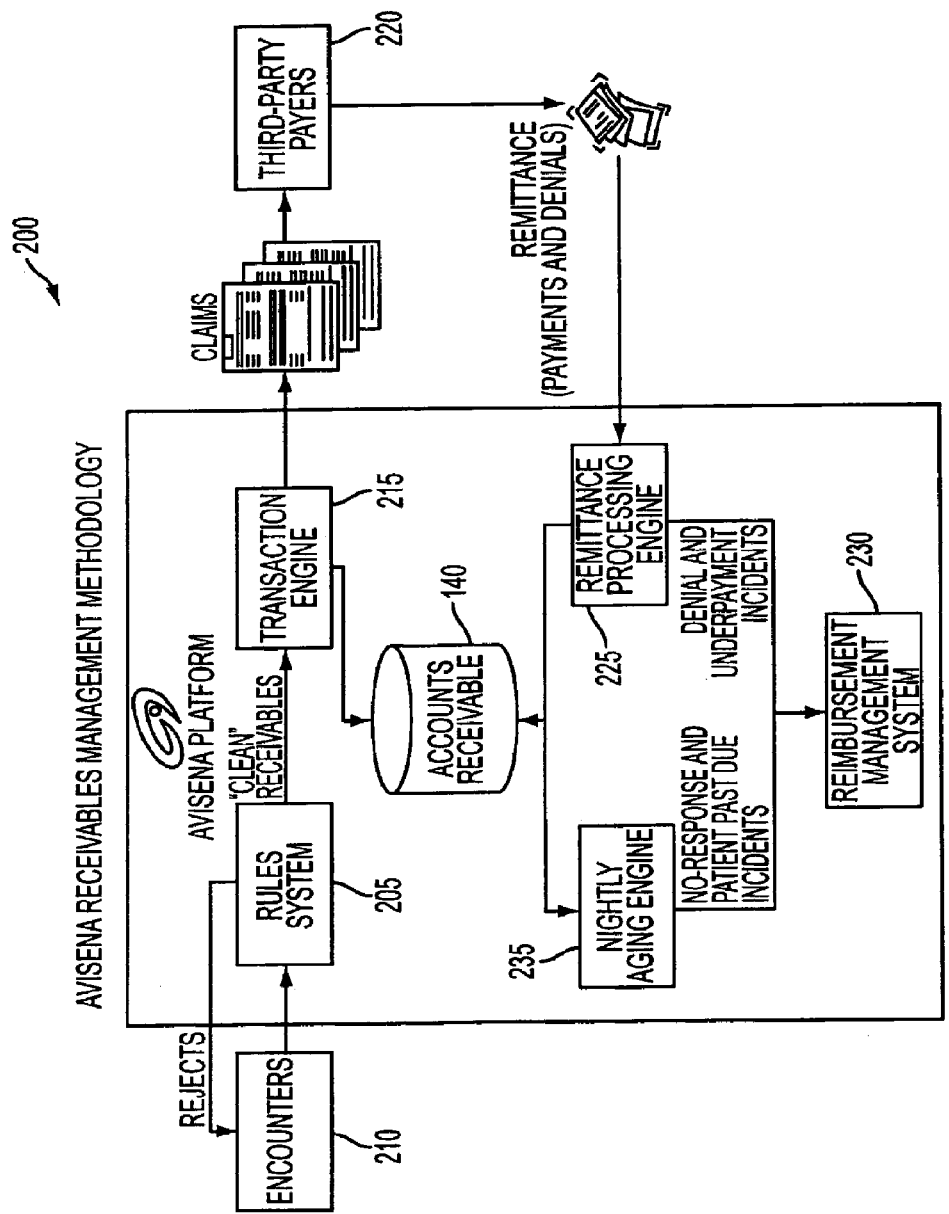
FIG. 2 illustrates one embodiment of a process flow diagram/system architecture 200 of the present invention.

The server station 130 is shown in more detail in FIG. 2. FIG. 2 illustrates one embodiment of a receivables management system architecture 200 using multiple dedicated servers or engines. In one embodiment, the system 200 may comprise: a rules engine or system 205 for receiving and processing encounters 210 from a provider and for validating the encounter against a pre-determined rules matrix, for example; a transaction engine or system 215 for presenting claims to third party payers 120 based on the encounters provided by the provider, and for forecasting the ability (or likelihood) of the provider to collect on the claim; a remittance processing engine or system 225 which processes the payments and denials received from the payers; a nightly aging system or engine 130 which processes claims that have not been paid or denied by a payer based on a by-client customizable and dynamic account receivable engine; a reimbursement management engine or system 135 for organizing collection items into an efficient configuration. The information and data relied upon by the dedicated systems may be stored in an accounts receivables database 140.

As shown, an encounter 210 is presented to system 200 by a provider using a client station 110, for example. The encounter may contain information such as patient accounts, historical and current clinical data, and other parameters directly related to the services rendered or performed on the patient. Billing information may also be provided. The encounter 210 is then processed by rules engine or system 205, which, in one embodiment, converts the encounters into receivables that are presented to the transaction engine or system 215. Transaction engine or system 215 then converts the receivables into claims and presents them to the appropriate payers 220 for payment. In one embodiment, the claims are presented electronically (i.e. through system 100) or by mail. Information and data needed for this process may be retrieved from and/or stored to database 140.

After receiving the various claims, payers 220 review the charges and decide whether they will make or deny payment. Payers' remittance may then presented to remittance processing engine or system 225. In one embodiment, the remittance may be made using client station 110. In another embodiment, remittance may be mailed and entered by an agent of system 200's administrator, for example. Reimbursement processing engine or system 225 may then process the payer's remittance and determine whether there has been a denial, no response, under or over payment, and past due incident, for example. Other determinations may be made. Next, remittance processing engine or system 225 may process payer denials and underpayment incidents, while nightly aging engine or system 230 may process no-response and/or patient past due incidents. Reimbursement management engine or system 235 may then be used to check electronic claim status, document all interaction with the insurance company and the patient/responsible party, send a letter to the insurance company and/or patient, edit the claim and resubmit it, bill the patient, write-off the receivable (if allowed) and send the item to appeal.

Figure 3:
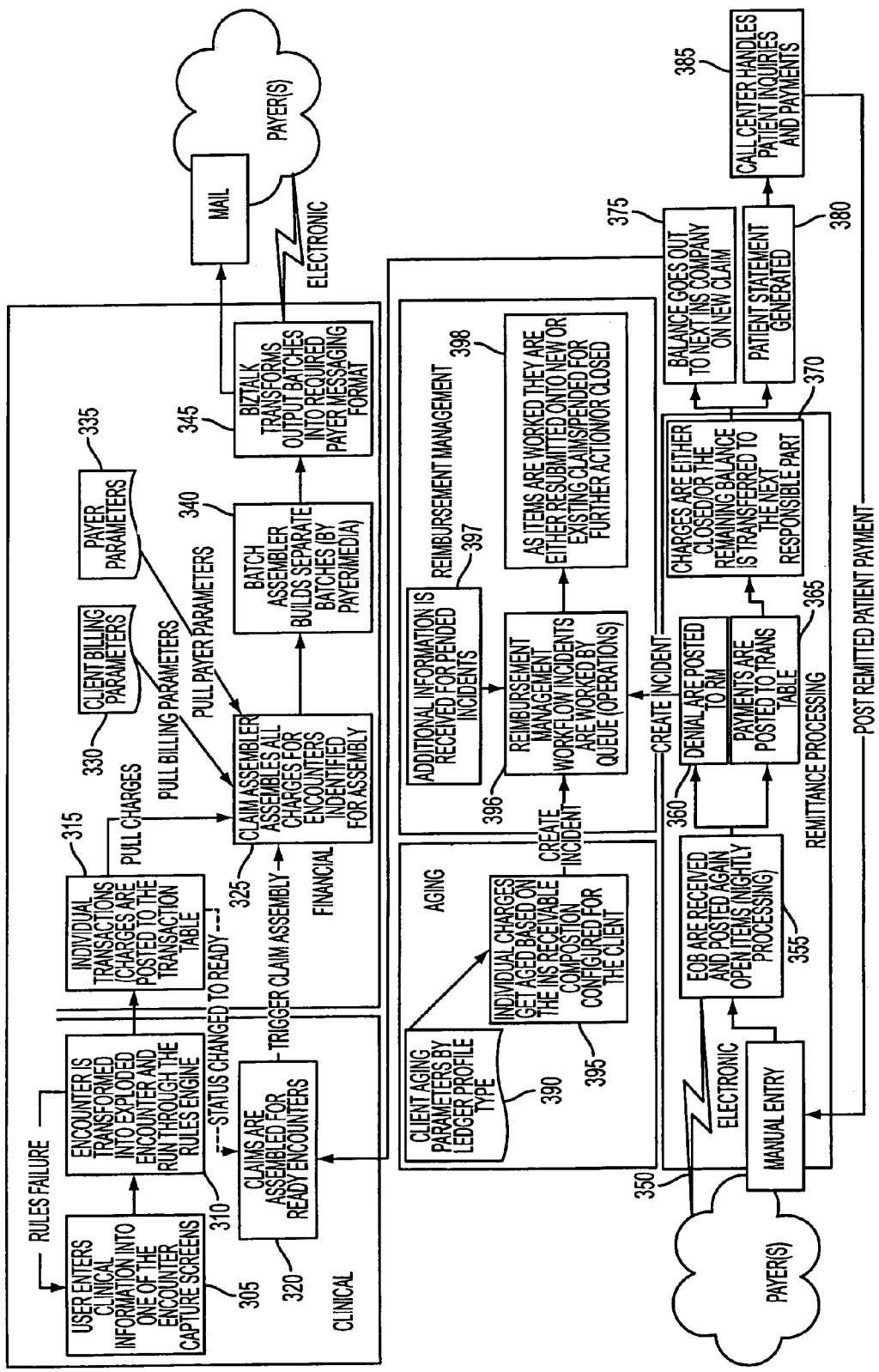
FIG. 3 illustrates one embodiment of a process flow diagram 300 of the present invention.

FIG. 3 illustrates one embodiment of a more detailed process flow 300 performed by receivables management system 200. At step 305, a provider (e.g., doctor, network, hospital, laboratory, etc.) interfacing with system 200 using station 110 may enter clinical information relating to particular services provided or rendered a patient. In one embodiment, the clinical information may be entered into an encounter capture screen, for example. In another embodiment, the clinical information may be provided manually by the provider, such as in a telephone conversation with an agent who then inputs the information or by sending the agent the information by mail, for example. At step 310, the encounter is received by rules processing engine or system 205 which transforms the encounter into an unbundled encounter and runs it through the rules engine. In one embodiment, the encounter is validated against a modular rules matrix that enables a determination of whether the encounter, in its present form, will be considered by the payer. Such assessment may involve whether the encounter is in a form desired by the payer, for example.

According to one embodiment, rules engine 205 may determine particulars about the payer, such as whether the payer categorically rejects or denies certain types of services without medical records or within a particular facility type, for example. If a rules failure occurs—for example the payer does not historically pay the specific charge or claim contained in the encounter under the circumstances—the provider may be immediately notified and offered the opportunity to correct, modify, or include additional information contained in the encounter to ensure acceptance of the service grouped within the encounter by the payer. The information provided to the provider by the rules engine is general enough to not suggest alternate clinical coding by t specific enough to allow the provider to correctly identify issues and correct the problem. The provider may, for example, be offered the opportunity to correct the description of the service(s) rendered or provided. This process may occur in real time. If the encounter is validated, rules engine or system 205 presents the encounter—now referred to as a clean receivable—to transaction engine or system 215 for further processing.

At step 315, transaction engine 215 receives the encounter and provides the encounter financial significance, i.e., it associates the encounter with a particular amount and by doing so converts its specific service lines into financial transactions. In one embodiment, transaction engine 215 may post the individual service lines for the encounters onto a transaction table. In another embodiment, transaction tables 215 posts the original (or billed) amount of the charge.

Once the encounter is posted it is converted into a claim, at step 320 the claims are assembled. At step 325, transaction engine 215 pulls and assembles all charges from the transaction table for those encounters which have been previously identified as ready for assembly, as designated at step 320. In one embodiment, the claim assembly may performed by a claims assembly module (not shown). During assembly, client billing parameters and payer parameters charges may be referred to, as shown in 330 and 335, respectively. In one embodiment, client billing parameters may indicate to whom payment must be made, the address of the recipient, as well as other client-specified parameters and exceptions. In another embodiment, payer parameters may indicate to whom the claims must be sent, who should receive payment, whether claims are to be sent electronically (i.e., over network 120) or by mail, the frequency for assembly in the case of automatic assembly of claims, and other information such as provider identifications that identify the provider submitting the claim.

Transaction engine 215 may also provide the provider that submitted the claim with a forecast of its ability or likelihood to collect the claims. In one embodiment, forecasting may be provided based on various variables, such as the terms of contracts between the payer and provider(s), fee schedule configurations, client-level global configurations, standard arrangements such as Medicare, Aetna, and other commercial or governmental carriers. Contracts between payer and providers typically indicate payment information such as formulas used to determine agreed-upon payment arrangements, fees, and/or schedules. In one embodiment, an administrator of system 100 may enter formulas, variables, from payer and provider contracts, as well as other variables which indicate how payments are to be determined. Global variables may comprise variables defined by the provider, such as location, business unit, business entity, In another embodiment, forecasting may be based on standard Medicare or Medicaid arrangements in the event carrier/payer-specific information is lacking, such as a contract, global variables, etc.

Next, at step 340 the assembled claims may be assembled into separate batches prior to delivery to the appropriate payer(s). In one embodiment, claim batches are assembled based on the recipient payer. That is, all claims directed to a particular insurance company, for example, are assembled and delivered in one set, irrespective of the provider or patient they correspond to. In another embodiment, batches may be assembled based on the media of delivery. For instance, batches that are to be sent electronically (i.e., over the network 120) are assembled separately from those that are to be sent by mail, for example. Other assembly methods are possible. At step 345, the batches are transformed into the appropriate format and delivered to the payers. In one embodiment, batches are outputted to payers electronically or by mail based on a global set of payer/carrier parameters kept within a global insurance library, for example.

Upon receipt of a claim, a payer determines whether it will pay or deny the claim. At step 350, the payer may use station 110 to access remittance processing engine or system 225 and provide an Explanation of Benefits (or EOB)—a description of the reasons why a particular claim was paid or denied. In this embodiment, the payer may interact with remittance processing engine or system 225 via a graphical user interface (GUI), which requests specific information from the payer regarding payment and denials of claims. In another embodiment, the payer may communicate with an agent of system 100's administrator, who in turn can input the necessary using station 110, for example. In one embodiment, the payer may provide the agent with the information over in-person, over the phone, or by mail, for example.

At step 355, the EOB may be received by remittance processing engine or system 225 and posted against open items for nightly processing, for example. In yet another embodiment, reimbursement management engine or system 225 may organize the explanation of benefits (i.e., collection items) into the most efficient configuration from a work perspective. For instance, EOBs that are denials may be separated from those that are payments. In one embodiment, reimbursement management engine or system 225 may, for example, post all denials to reimbursement management engine or system 365, where they may be then worked automatically or by an agent of the administrator of system 200, as shown at step 360. EOBs that are payments may, in another embodiment, be posted to the transaction table, which may comprise a client-specific ledger that keeps record of the clients on-going balances, such as a payer's balance with a particular provider, for example. In one embodiment, reimbursement management engine or system 225 may organize incidents in an efficient manner so that they may be worked together, for example.

In separating or distinguishing EOBs, reimbursement management engine or system 230 may use different types or forms of requests. In one embodiment, EOBs may be designated into four categories or incidents: (1) denial incidents, (2) no-response incidents, (3) underpayment incidents; and (4) patient past-due incidents. Other categories or incidents are possible.

Denial incidents, for example, may result from the denial of a claim or part of a claim. In one embodiment, denial incidents may be categorized into 6 major categories and subsequently subdivided into their underlying denial reason as follows:

| | Authorization Problem |
|---|---|
| B6 | Services not provided or authorized by designated (network) providers. |
| B7 | Services denied at the time authorization/pre-certification was requested. |

| | Coding Problem |
|---|---|
| B0 | The procedure code is inconsistent with the provider type. |
| BJ | The procedure code is inconsistent with the modifier used or a required modifier is missing. |
| BK | The procedure code/bill type is inconsistent with the place of service. |
| BL | The procedure code is inconsistent with the patients age. |
| BM | The procedure code is inconsistent with the patients gender. |
| BR | The diagnosis is inconsistent with the patients age. |
| BS | The diagnosis is inconsistent with the patients gender. |
| BT | The diagnosis is inconsistent with procedure. |
| BU | The diagnosis is inconsistent with the provider type. |
| CL | Claim denied charges. |
| CM | Claim denied; ungroupable DRG |
| CU | Payment adjusted because this procedure/service is not paid separately. |
| CW | Payment denied because this procedure code/modifier was invalid on the date of service or claim submission. |
| D0 | Claim/service denied because information to indicate if the patient owns the equipment that requires the part or supply was missing. |
| D1 | Claim/service does not indicate the period of time for which this will be needed. |
| D2 | Claim/service denied. Claim lacks individual lab codes included in the test. |
| D4 | Claim/service denied. Claim lacks date of patients most recent physician visit. |
| D5 | Claim/service denied. Claim lacks indicator that x-ray is available for review. |
| D6 | Claim/service denied. Claim lacks invoice or statement certifying the actual cost of the lens, less discounts or the type of intraocular lens used. |
| D7 | Claim/service denied. Completed physician financial relationship form not on file. |
| D8 | Claim lacks completed pacemaker registration form. |
| D9 | Claim/service denied. Claim does not identify who performed the purchased diagnostic test or the amount you were charged for the test. |

| | Coverage Problem |
|---|---|
| B1 | Claim denied. Insured has no dependent coverage. |
| B4 | Claim denied. Insured has no coverage for newborns. |
| B5 | Benefit maximum has been reached. |
| B9 | Non-covered charge(s). |
| BF | Payment denied because service/procedure was provided outside the United States or as a result of war. |
| BH | Payment denied. The advance indemnification notice signed by the patient did not comply with requirements. |
| BI | Patient is covered by a managed care plan. |
| BX | Our records indicate that this dependent is not an eligible dependent as defined. |
| BZ | Claim denied because this is a work-related injury/illness and thus the liability of the Workers Compensation Carrier. |
| C0 | Claim denied because this injury/illness is covered by the liability carrier. |
| C1 | Claim denied because this injury/illness is the liability of the no-fault carrier. |
| C4 | These are non-covered services because this is a pre-existing condition |
| C6 | Services by an immediate relative or a member of the same household are not covered. |
| C7 | Multiple physicians/assistants are not covered in this case. |
| C8 | Claim/service denied because procedure/treatment is deemed experimental/investigational by the payer. |
| C9 | Claim/service denied because procedure/treatment has not been deemed proven to be effective by the payer. |
| CA | Payment denied. Your Stop loss deductible has not been met. |
| CB | Expenses incurred prior to coverage. |
| CC | Expenses incurred after coverage terminated. |
| CD | Coverage not in effect at the time the service was provided. |
| CE | The time limit for filing has expired. |
| CF | Payment adjusted because the patient has not met the required eligibility, spend down, waiting, or residency requirements. |

-continued

| | |
|---|---|
| CG | Claim denied as patient cannot be identified as our insured. |
| CH | This (these) service(s) is (are) not covered. |
| CI | This (these) diagnosis(es) is (are) not covered, missing, or are invalid. |
| CJ | This (these) procedure(s) is (are) not covered. |
| CK | Charges for outpatient services with this proximity to inpatient services are not covered. |
| CO | Claim/service not covered/reduced because alternative services were available, and should have been utilized. |
| CP | Services not covered because the patient is enrolled in a Hospice. |
| CQ | The claim/service has been transferred to the proper payer/processor for processing. Claim/service not covered by this payer/processor. |
| CT | Payment denied because only one visit or consultation per physician per day is covered. |
| CV | Payment adjusted because this service was not prescribed by a physician, not prescribed prior to delivery, the prescription is incomplete, or the prescription is not current. |
| B2 | These are non-covered services because this is a routine exam or screening procedure done in conjunction with a routine exam. |

Enrollment Problem

| | |
|---|---|
| BC | Claim not covered by this payer/contractor. You must send the claim to the correct payer/contractor. |
| BE | Not covered unless the provider accepts assignment. |
| C5 | The referring/prescribing/rendering provider is not eligible to refer/prescribe/order/perform the service billed. |
| CN | This provider was not certified/eligible to be paid for this procedure/service on this date of service. |
| CX | Payment denied because this provider has failed an aspect of a proficiency testing program. |
| DA | Claim/service denied. Performed by a facility/supplier in which the ordering/referring physician has a financial interest. |

Justification Problem

| | |
|---|---|
| B3 | Payment denied/reduced because the payer deems the information submitted does not support this level of service, this many services, this length of service, this dosage, or this days supply. |
| B8 | Charges do not meet qualifications for emergent/urgent care. |
| C3 | These are non-covered services because this is not deemed a medical necessity by the payer. |
| CR | Services not documented in patients medical records. |
| CY | Claim/service denied. Level of subluxation is missing or inadequate. |
| CZ | Claim lacks the name, strength, or dosage of the drug furnished. |
| D3 | Claim/service denied. Claim did not include patients medical record for the service. |
| DB | Claim lacks indication that plan of treatment is on file. |
| DC | Claim lacks indication that service was supervised or evaluated by a physician. |

Procedural Problem

| | |
|---|---|
| BD | Billing date predates service date. |
| BN | Payment denied - Prior processing information appears incorrect. |
| BO | Claim denied. Interim bills cannot be processed. |
| BP | Claim/service denied. Appeal procedures not followed or time limits not met. |
| BQ | Patient/Insured health identification number and name do not match. |
| BV | The date of death precedes date of service. |
| BW | The date of birth follows the date of service. |
| BY | Duplicate claim/service. |
| C2 | Claim/service lacks information which is needed for adjudication. |
| CS | Previously paid. Payment for this claim/service may have been provided in a previous payment. |
| BA | The hospital must file the Medicare claim for this inpatient non-physician service. |
| BB | Claim/service denied because the related or qualifying claim/service was not paid or identified on the claim. |
| BG | Procedure/product not approved by the Food and Drug Administration. |

No-Response incidents, for example, may result from the lack of payment or denial of a particular claim or part of a claim. In one embodiment, no-response incidents may generally be categorized by payer-category as follows (this may vary under customer-specific circumstances):

| | |
|---|---|
| N01 | No-Response (Medicare) |
| N02 | No-Response (Medicaid) |
| N03 | No-Response (Commercial Fee-For-Service) |
| N04 | No-Response (HMO) |
| N05 | No-Response (Workman's Compensation) |
| N06 | No-Response (Accident) |
| N07 | No-Response (Secondary) |

Underpayments incidents, for example, may result from a payment that is less than what is expected. Underpayment incidents are also generally categorized by payer-category as follows (this may vary under customer-specific circumstances):

| | |
|---|---|
| U01 | Underpayments (Medicare) |
| U02 | Underpayments (Medicaid) |
| U03 | Underpayments (Commercial Fee-For-Service) |
| U04 | Underpayments (HMO) |
| U05 | Underpayments (Workman's Compensation) |
| U06 | Underpayments (Accident) |
| U07 | Underpayments (Secondary) |

Patient past due incidents, for example, may result from a patient balance going beyond the appropriate limits. In one embodiment, past due incidents may be grouped into 2 different categories including:

| | |
|---|---|
| P01 | Past-Due Self-Pay |
| P02 | Past-Due Co-Insurance |

In another embodiment, 10 additional different transfer of responsibility status codes are used to further facilitate proper routing of incidents to the appropriate individual for further collections activities.
11 Office Notes Needed to Process Claims
12 Remittances
13 Verify Patient Insurance Information
14 Need Copy of Insurance Card

| Medical Records Needed to Process | |
|---|---|
| 15 | Claims |
| 16 | Procedure Not Valid |
| 17 | Diagnosis Inconsistent with Procedure |
| 18 | Need Medipass Number |
| 19 | Authorization to Re-process Claims |
| N0 | Accepted By Insurance - Pending Adjudication |

Based on the above categories, remittance processing engine or system 225 may create and organize incidents which are then posted to the reimbursement management system 230, for example, for further working. For example, assume a particular payer denied a claim and in the EOB indicated that it was denied because there was a coverage problem, particularly the patient, the insured's child, was not covered because the policy at issue did not include dependent coverage. Such a denial would be represented by Code B1 in the denial incidents chart shown above. At step 360, therefore remittance processing engine or system 225 would then post a denial incident of B1 to the reimbursement management engine or system 230, which may then work collection of the charge. In another embodiment, prior to posting the incident, remittance processing engine or system 225 may gather, collect and organize incidents having common codes, for examples, or incidents that are going to the same payer, or from the same provider, for example. Other categories or incidents are possible. This way, denials may be routed and posted in a way that promoted efficient and effecting working of the incident during the collections process. In another embodiment, remittance processing engine or system 225 may append additional information to an incident prior to posting to enhance the collections process. For instance, additional information specific to the payer, provider, patient, or their respective accounts, may be added to refine or enhance collection of the charge. Therefore, in one embodiment, remittance processing engine or system 225 may operate to organize incidents in such a way that reimbursement management engine or system 230 can ultimately work the collection process in an efficient and cost-effective manner.

At step 365, remittance processing engine or system 225 may post all payments to the transaction table. In one embodiment, posting of payments may result in elimination of an incident from the collections process, e.g., the charge is paid in full. In another embodiment, the payment may result in an underpayment, which may be treated as a denial as shown above, or which may result in the passing of the remaining balance to a secondary provider, for example, or the patient, as shown at steps 370, 375, and 380. At step 385, a call center, such as one associated with reimbursement management engine or system 230, for example, may handle patient and payer inquiries and payments.

In another embodiment, the system and method of the invention may process all responses from third-party payers, including denials. At present, each payer has a different set of reasons for which it denies. Under the new Health Insurance Portability and Accountability Act (HIPAA) guidelines, however, there is a standardized set of denial reasons. The system and method of the invention may be used to adopt these reasons as standard and work to translate any denials that occur into this code set. Each denial and associated remarks is posted against individual open receivables within a claim. In fact, if individual items on a claim are denied for different reasons, each reason is captured. Additionally, the posting source can post additional information that can later be used during the collections process.

Once the denial is posted, the invention may automatically push the denial to the collections system (Reimbursement Management System) for immediate processing by a collector and/or the customer staff. In the Reimbursement Management System, collectors have the ability to check electronic claim status, document all interaction with the insurance company and the patient/responsible party, send a letter to the insurance company and/or patient, edit the claim and resubmit it, bill the patient, write-off the receivable (if allowed, based on collection rules) and send the item to appeal.

In addition to denials, the system and method of the invention may also post all relevant fields that appear on a remittance advice. These fields typically include amount allowed or disallowed, amount applied to deductible, amount applied to co-insurance and/or co-payment, amount due from patient and amount paid. By posting these pieces of information the system and method of the invention is able to capture an ongoing snapshot of payer payment policies. The most important of these is the amount that the payer deems the receivable is worth (the amount allowed). Irrespective of the ultimate payment, the amount allowed should correspond to the system and method of the invention's previously assessed "value." In the event that the two deviate in a significant fashion to the detriment of the customer, the event may be identified as an "underpayment" and an incident pushed to the Reimbursement Management System. Otherwise, the approved amount is compared against the value in the Rules System and may result in an adjustment of the value amount. In the Reimbursement Management System, collectors have the ability to document all interaction with the insurance company, send a letter to the insurance company and/or patient, edit the claim and resubmit it, bill the patient, write-off the receivable (if allowed) and send the item to appeal.

Additional incidents may be posted to reimbursement management engine or system 230 by nightly aging engine or system 235. In one embodiment, for example, nightly aging engine or system 235 may process certain incidents, such as no response incidents and/or patient past-due incidents, for example. Traditionally, receivables management systems have aged once per month, at the time when the month is closed. This provides for a distorted accounts receivable picture because individual accounts (or component parts) are moved between current, 30, 60, 90 and 180+ categories only at that time. In reality, these items may move between these categories at any time during the month and may require immediate attention.

In one embodiment, therefore, nightly aging engine or system 235 may age all receivables on a nightly basis. In one embodiment, nightly aging engine or system 235 may age based on client aging parameters by ledger profile type, for example, as shown in step 390. In another embodiment, individual charges may age based on the accounts receivable composition configuration for the client, for example, as shown at step 395. Because system 200—particularly remittance processing system or engine 225—posts all responses, including denials, from third-party payers, any insurance receivable that does not have either a payment or a denial posted against it after a pre-defined amount of time (which may vary by third-party payer, for example), may be deemed a "No-Response" receivable. Upon identification, the nightly aging system or engine 235 automatically creates a "No-Response Incident" and posts it to the Reimbursement Management System for collections staff to immediately begin working. In the reimbursement management engine or system 230, collectors or agents have, for example, the ability to check electronic claim status, document all interaction with the insurance company and the patient/responsible party, send a letter to the insurance company and/or patient, edit the claim and resubmit it, bill the patient, write-off the receivable (if allowed) and send the item to appeal.

Furthermore, any patient receivable that ages beyond a certain point (for example, after 2 statements have been sent) may be deemed to need collections work. This receivable subsequently may generate a "Past-Due Patient Incident" in the Reimbursement Management System for collections staff to begin working. In the Reimbursement Management System, collectors have the ability to document all interaction with the patient/responsible party, send the patient to a collections agency, send another statement, send a number of different letter formats or bill an insurance company.

Each of the aforementioned scenarios can also be preempted with automatic actions that can be defined in the system. For instance, when a claim is deemed "No-Response," the system can automatically generate an electronic claim status request that, if successful, can resolve the claim issue automatically without involving a human being. Other automatic actions include rebilling the claim, sending a letter to the insurance company/patient or billing the patient.

In one embodiment, nightly aging engine or system 235 may age according to an accounts receivable composition model which categorizes outstanding receivables in a way that follows the work involved in collecting them and facilitates the identification of problem areas.

Figure 4:
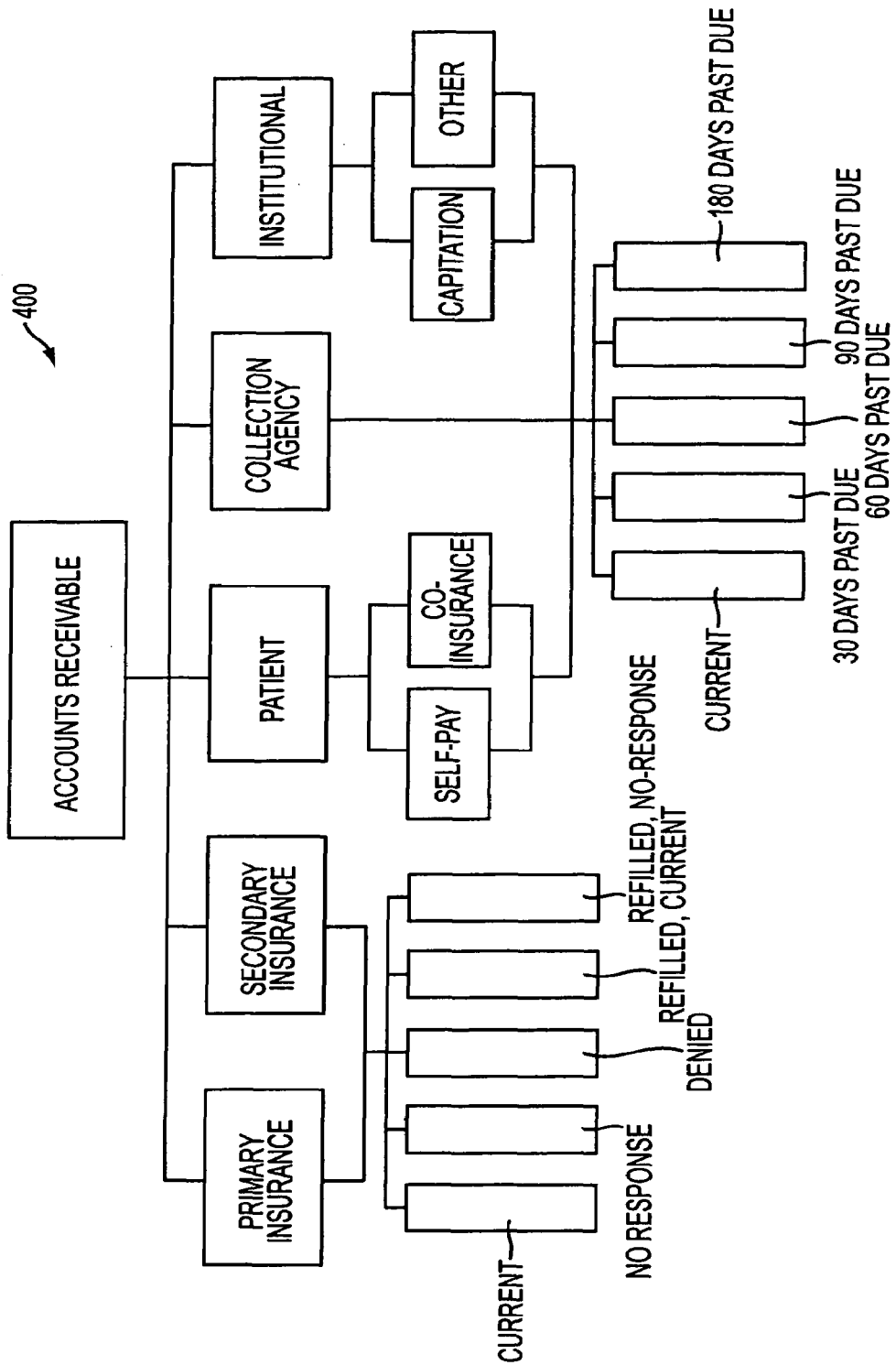
FIG. 4 illustrates one embodiment of a structure used by the system and method of the invention's accounts receivable composition model to categorizes outstanding receivables.

FIG. 4 illustrates one embodiment of a structure 400 for categorizing outstanding receivables. Primary and secondary insurance carriers may be categorized as current, no-response, denied, refiled/current, and refiled/no-response, for example. Patient accounts may be categorized as self-pay and co-insurance, which may then be individually subcategorized as current, 30 days past due, 60 days past due, 90 days past due, and 180 days past due, for example. Collection agency accounts may be categorized as current, 30 days past due, 60 days past due, 90 days past due, and 180 days past due, for example. Institutional accounts may be categorized as capitation and other, which may then be individually subcategorized as current, 30 days past due, 60 days past due, 90 days past due, and 180 days past due, for example.

With built-in knowledge of these payment patterns, nightly aging engine or system 235 may leave insurance receivables in the current category until typical payment thresholds have been exceeded. At this point, the receivable may be moved to a "No-Response" status, for example. This allows for a proper representation of receivables status and lays the foundation for an efficient collections process. In one embodiment, structure 400 for categorizing outstanding receivables may: properly identifies past due receivables; segregate receivables into workable categories; separate receivables worked once from receivables worked more than once (more severe).

At step 396, reimbursement management engine or systems 230 may work incoming incidents by queue (operations), for example. Incidents incoming from nightly aging engine or system 235 and remittance processing engine or system 225 may be merged together if they are deemed to be related (for instance, from the same encounter/claim). In one embodiment, incoming incidents are queued according to type, such as denial incident, no response incident, etc. Additional information—from appropriate financial ledger(s), for example—may then be received and appended to the incident, as shown at 397. At step 398, incidents may be routed for working by agents or operators (e.g. collectors) of system 200. As incidents are worked they may be resubmitted onto new or existing claims, pended for further action, or closed, for example. In reimbursement management engine or system 230, collectors may document all interaction with the patient/responsible party, send the patient to a collections agency, send another statement, send a number of different letter formats or bill an insurance company.

In another embodiment, incidents in the reimbursement management system 230 may be assigned to queues and or collectors based on the nature, source, and severity of the incident. Based on these factors, the incidents may be assigned to specific queues that are associated with individuals or groups that are responsible for taking the incident to closure. This may involve any number of outcomes, including but not limited to: assembly and submission of a new claim, resubmission of the claim or charges; issuing a letter to the payer; writing off the charge or claim; correcting the patient record or claim; and submitting addition information to the payer.

Incidents in these queues may be assigned and reassigned (based on skills based routing, for example) and routed to the appropriate resources that are best suited to resolve the incident. Work associated with these incidents may be tracked in the system using these queues and may be assigned to individuals or transferred to other queues when appropriate.

Work may also be assigned to and from staff, employees and client employees using messaging mechanisms and other queues that communicate the work required (information requests, etc.) to the staff or client resource, and track the amount of time these requests have remained outstanding.

In another embodiment, each incident and queue may have metrics upon which alert mechanisms are driven to assure that incidents are dealt with in a timely manner, and to assure that queues are and resources are not overloaded. If other resources are underutilized, work may be assigned to the proper resource or queue until the primary resource for that incident type is less utilized.

Figure 5:
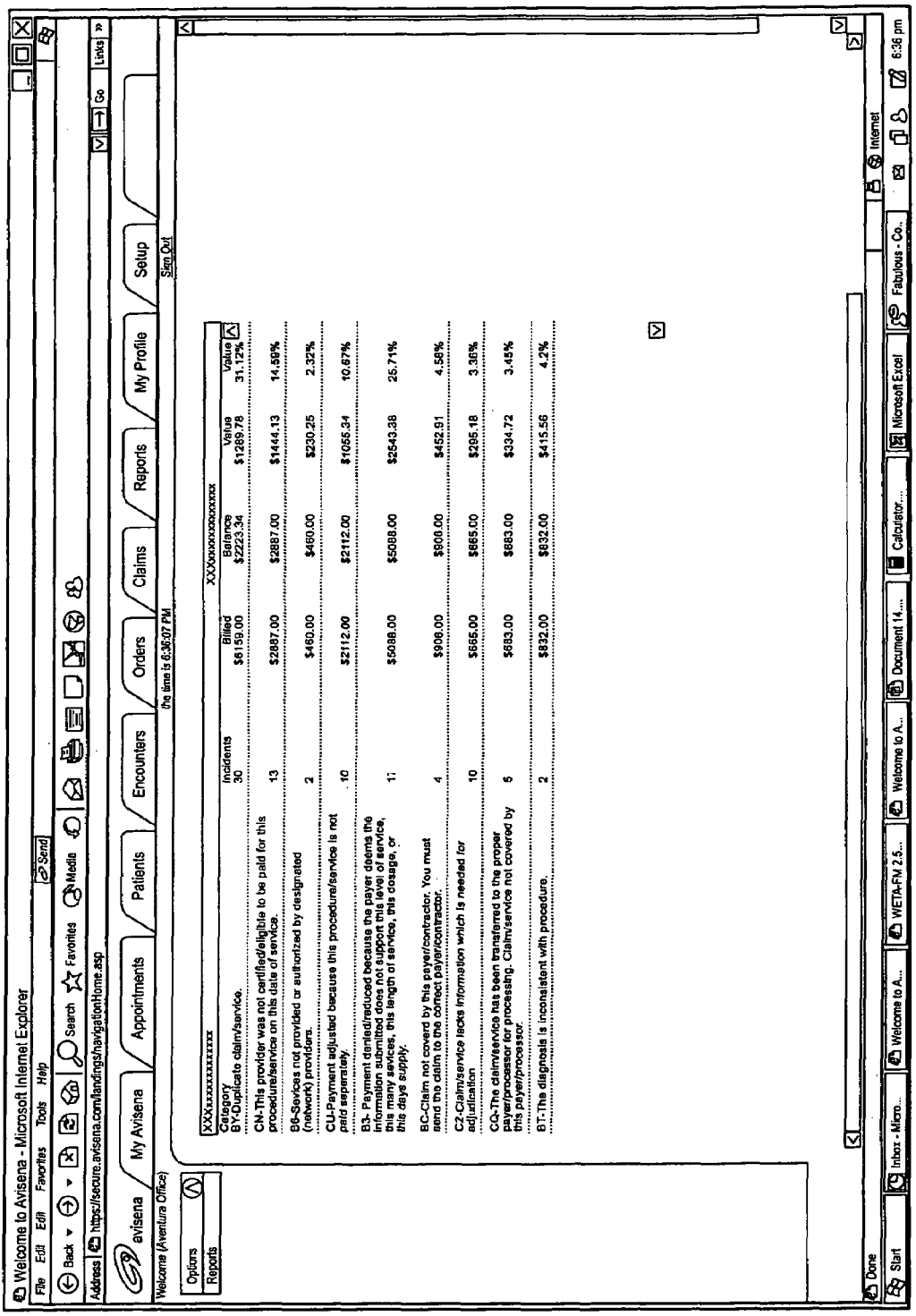
FIG. 5 illustrates one embodiment of a screen shot viewed by a user of the reimbursement management system showing various reimbursement management categories.

Examples of graphical user interfaces (GUI) used by collectors in the reimbursement management engine or system 230 follow:

FIG. 5 illustrates one embodiment of a screen shot viewed by a user of the reimbursement management system, such as a collector or a provider, for example. Various reimbursement management categories are provided-BY, CN, B6, CU, B3, BC, C2, CQ, and BT. The categories shown relate to claims submitted by a provider. As shown, incidents may be grouped by category and indicate information such as total billed, balance remaining, value, and percentage of category incidents to total incidents submitted. For example, the screen shot shows that there are 30 incidents submitted relating to category BY—duplicate claims/service, a billed amount of $6159,00, a balance of $2223.34, value of $1289.78, and percentage of 31.12%. In one embodiment, the value amount reflects an estimated amount that the provider will be able to collect, which may based on parameters such as payer historical and current payment patterns and other like variables. Value may, in one embodiment, be determined by transaction processing engine or system 215 based on information stored in appropriate financial ledgers, such as the ledgers of the corresponding payers, for example.

Figure 6:
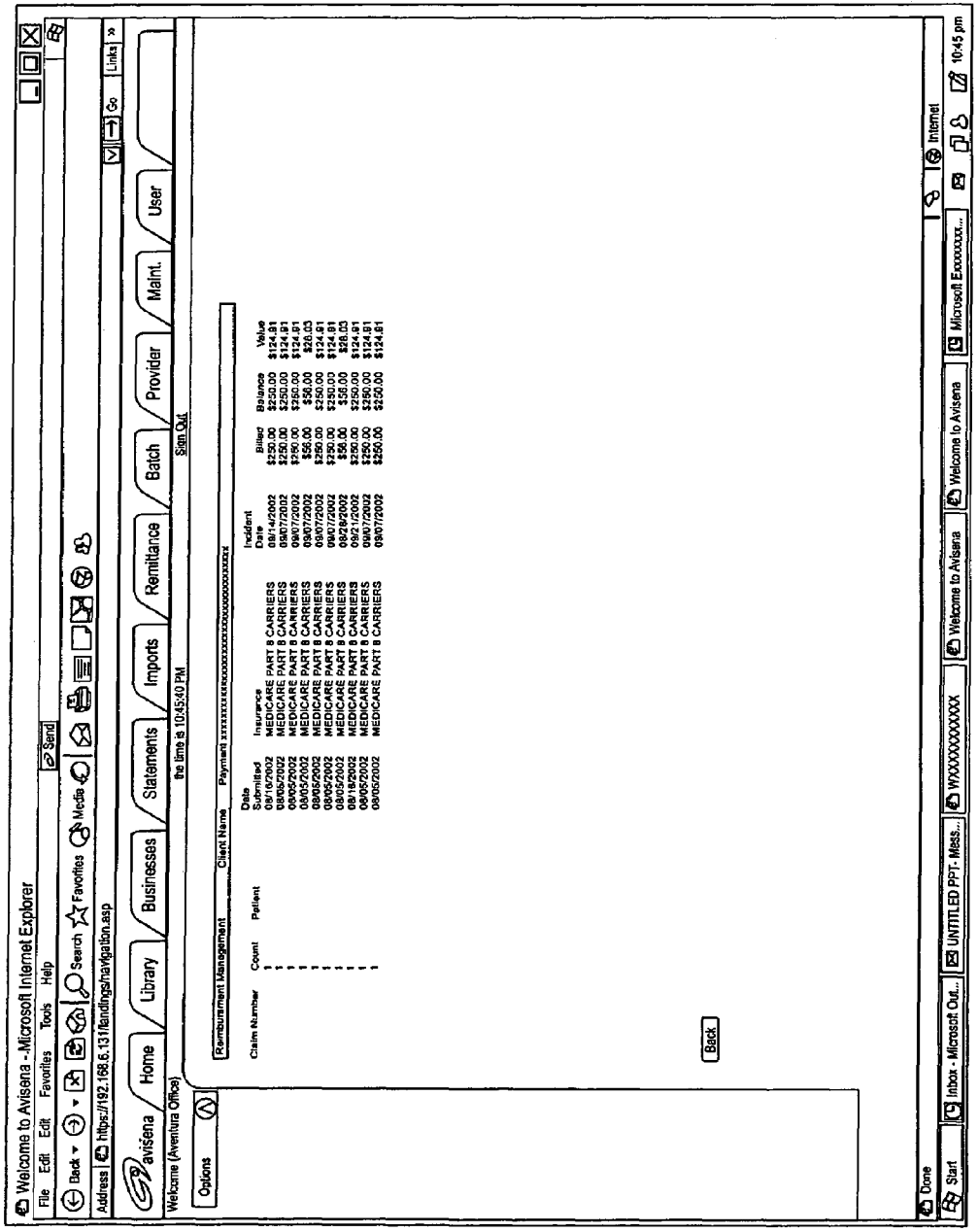
FIG. 6 illustrates one embodiment of a screen shot viewed by a user of the reimbursement management system showing various incidents within a category.

FIG. 6 illustrates one embodiment of a screen shot viewed by a user of the reimbursement management system. The drill down information shown relates to category CU, which in FIG. 5 is shown as having 10 incidents. As shown, each incident corresponds to a particular patient, and provides a claim number, the date submitted, the payer or insurance company, the incident date, the amount billed, the balance, and the value.

Figure 7:
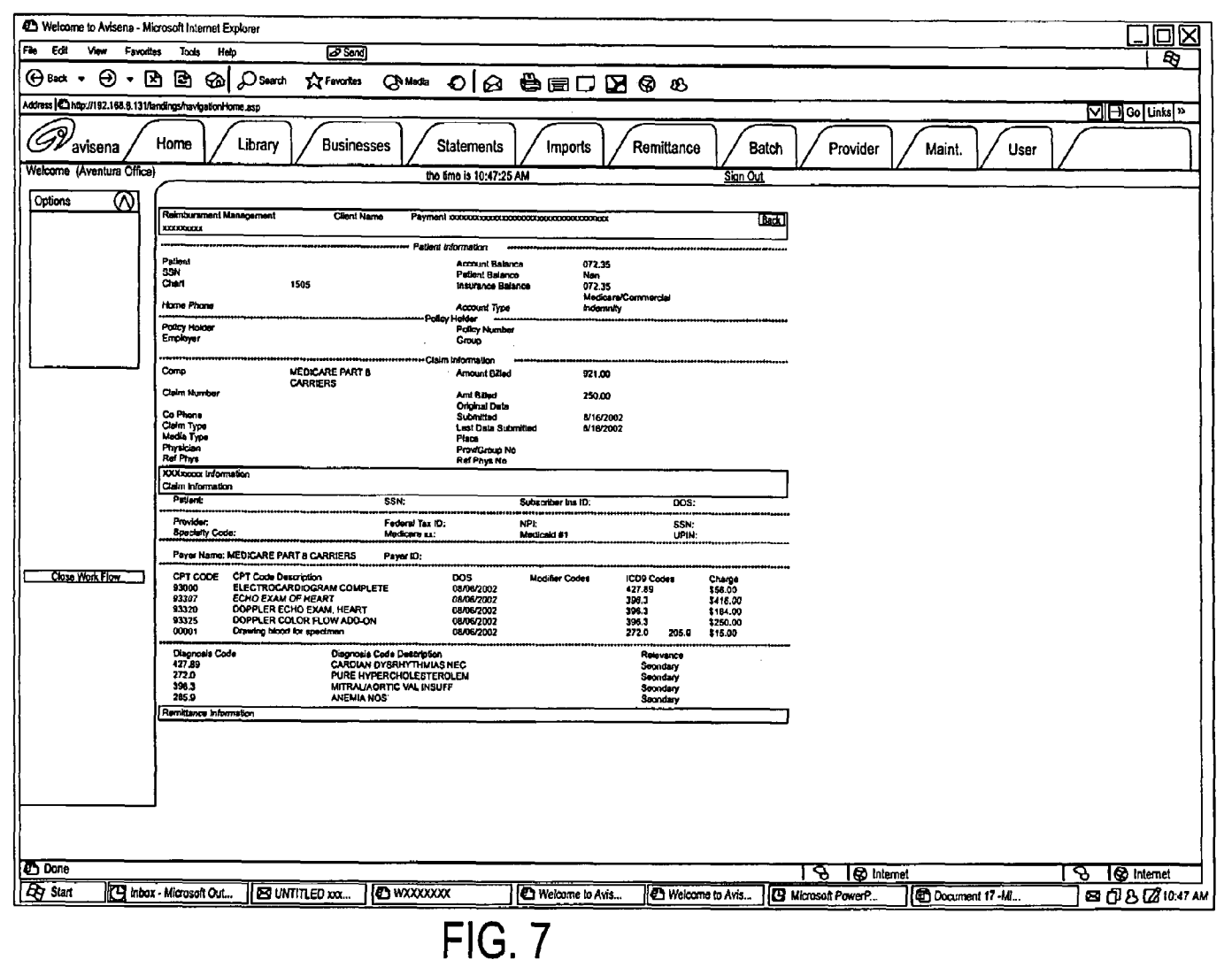

FIG. 7 illustrates one embodiment of a screen shot viewed by a user of the reimbursement management system. The information shown relates to claim number 6HHZEV53 shown in FIG. 5. Information provided includes patient information, the account balance, patient balance, insurance balance, account type, policy information, encounter and claim information (such as CPT codes), diagnosis information for example.

Figure 8:
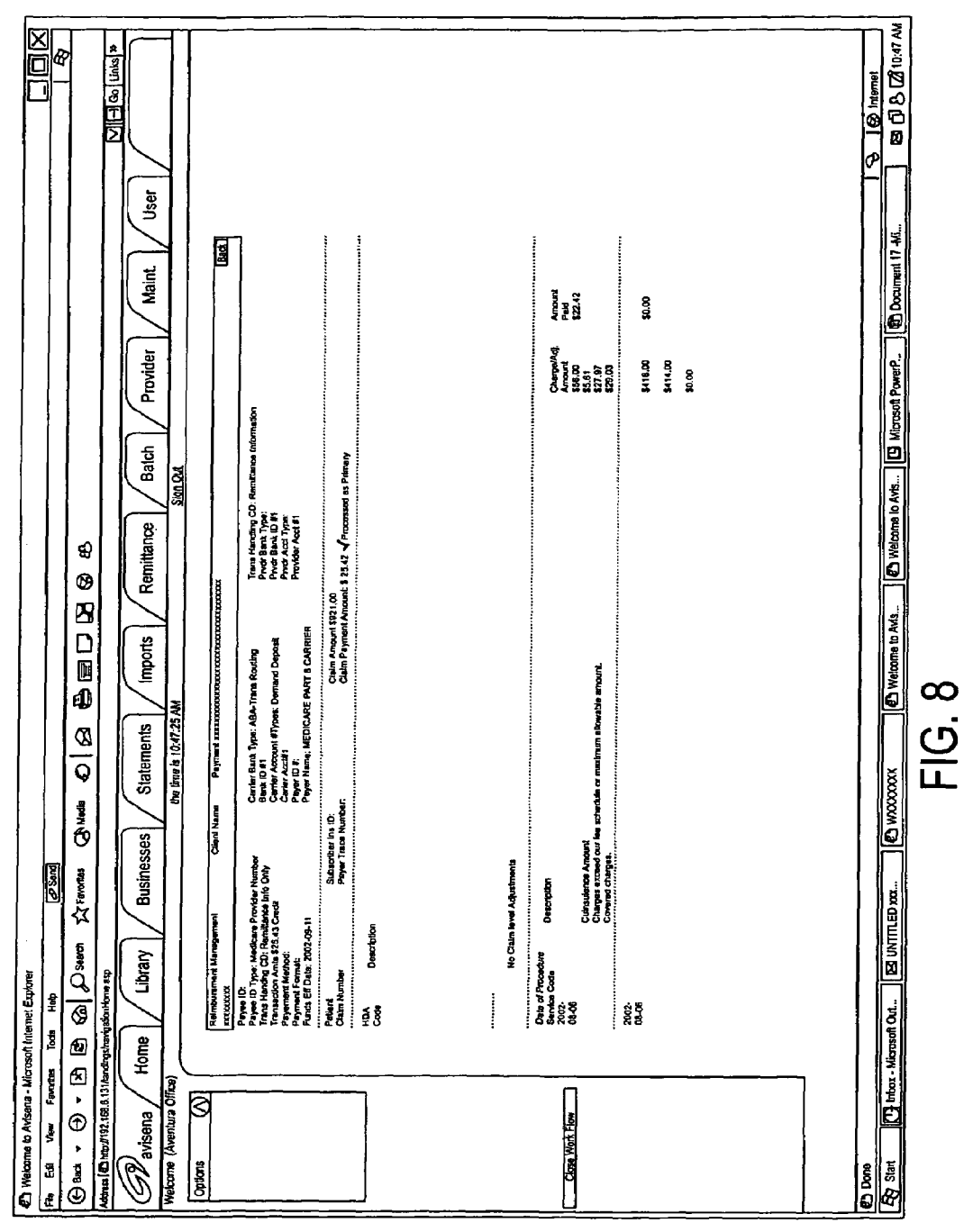

FIG. 8 illustrates one embodiment of a screen shot viewed by a user of the reimbursement management system. An individual incident with denial detail is provided. The information shown relates to a claim number 7L0718EY, and reflects that payment for one claim ($56.00) was reduced to ($22.42) and payment for another claim ($416.00) was denied because the information provided did not substantiate need for the service.

Each of the screens shown in FIGS. 5-8 indicate that a user of the system of the invention, such as a collector using reimbursement management engine or system 230, for example, may obtain a wider source of information, including information relating to: insurance library, businesses, Px Statements, Px Import, remittances, batches, providers, maintenance, users and reimbursements, for example. A collector may also edit claims and encounter information, patient information, and provider information, for example. Other information may be edited.

The various engines or systems comprising system 200 are now described in additional detail.

Figure 9:
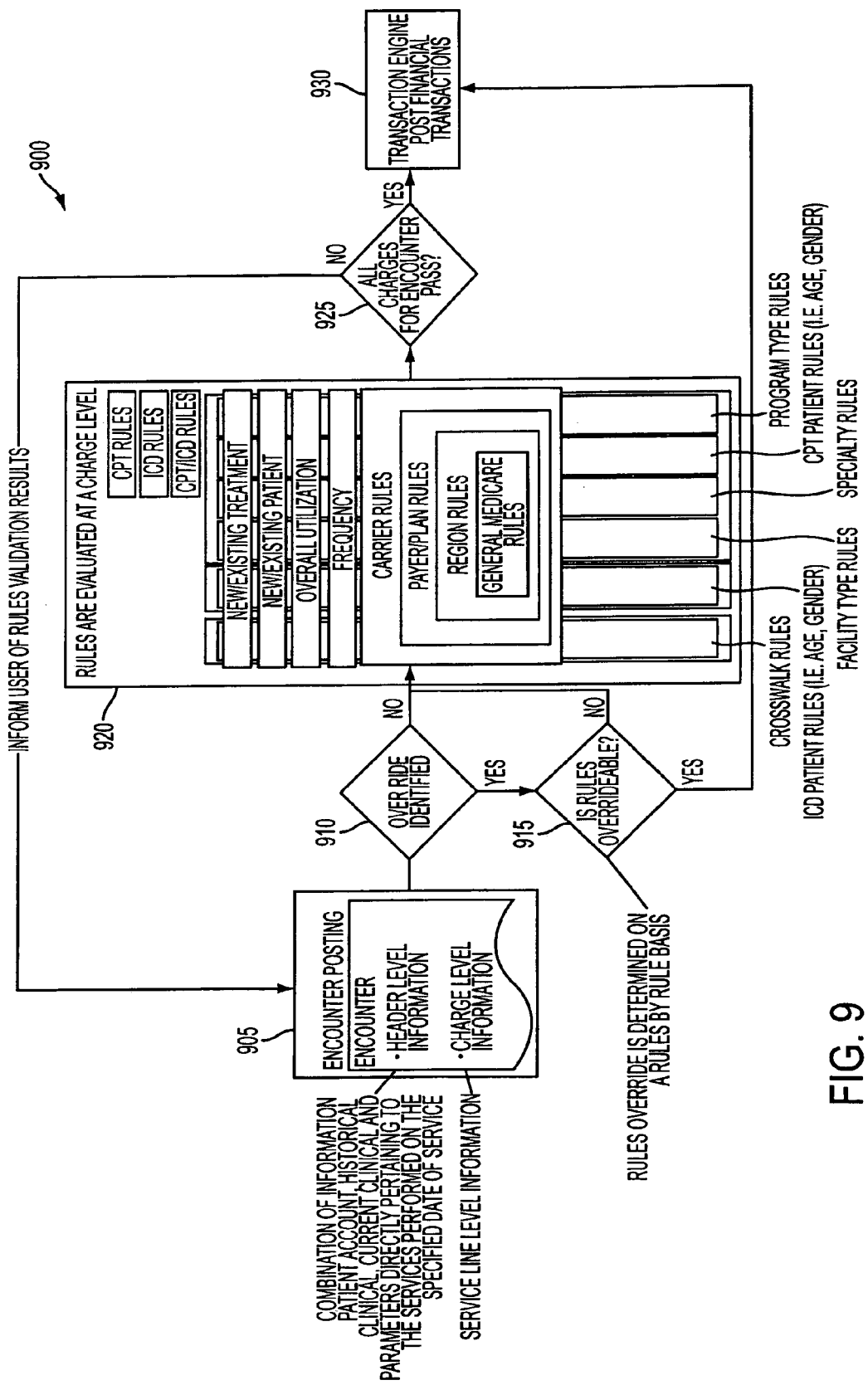
FIG. 9 illustrates one embodiment of a process flow diagram 900 performed by the rules engine or system of the present invention.

FIG. 9 illustrates one embodiment of a process 900 which may be performed by rules engine or system 205 in ascertaining the validity of an encounter, for example. At step 905, a provider, for example, inputs encounter information using station 110, or, alternatively, provides the information by mail or over the telephone to an agent having access to system 200, for example. At step 910 a determination is made by rules engine 205, based on information contained in the encounter, whether an over-ride is identified. In one embodiment, an over-ride indicates the rules process may be by-passed, for example. In another embodiment, only certain types of rules are override capable. If one is identified, rules engine determines, at step 915, whether the over-ride permits the rules process to be by-passed. If not, the process continues to the rules evaluation stage, at step 920. If by-pass is permitted, then the encounter information is posted to the transaction engine.

If by-pass is not permitted or if an over-ride is not identified, the rules evaluation stage commences at step 920. In this step, the information contained in the encounter is evaluated, at a charge level, with information contained in a rules matrix, for example. Such information may include details about CPT rules, ICD rules, CPT/ICD rules, new/existing treatment, new/existing patient, overall utilization, frequency, carrier rules, payer/plan rules, region rules, general medicare rules, crosswalk rules, ICD patient rules (e.g., age, gender), facility type rules, specialty rules, CPT patient rules (e.g., age, gender), and program types rules. Collectively, these rules allow the systems to simulate the adjudication of individual service lines and between service lines on encounters based on predetermined criteria or qualifications that must be met before the encounter may be passed to a payer for payment, for example. This enables a payer to reduce claim workload by preliminarily rejecting encounters that do not meet minimum requirements, for example. The above rules demonstrate the various levels that may be used to filter or assess encounter. At step 925, rules engine 205 determines whether the encounter satisfies the various rules requirements. If it does not, the provider or agent that entered the encounter information is alerted of the rejection and may be permitted to provide additional information or edit provided information in an effort to overcome the rejection. In one embodiment, the provider or agent may be provided a predetermined number of opportunities to amend encounter information. If, however, the encounter information passes or satisfies all rules requirements, it is posted to the transaction processing engine or system 215, at step 930, for further processing.

In one embodiment, rules engine or system 205 may host and/or process information and data detailing how specific payers treat health care activities from a financial and administrative perspective. In one embodiment, such information and data may comprise information about particular procedure, such as the corresponding procedure and diagnosis codes, for example. In another embodiment, the knowledge may comprise a particular payer's historical record or pattern on paying and/or denying specific procedures and/or diagnosis. This allows a payer to arrange for automatic denial or acceptance of specific procedures and/or diagnosis. In another embodiment, the rules engine or system may operate as a browser-based system which immediately notifies the user that an encounter is not acceptable. For instance, if a physician attempts to bill any of the following scenarios, the payer may apply both automated and manual adjudication rules to deny the claim:

A pap smear on a male patient
A vasectomy on a 5 year-old patient.
A chest x-ray for diagnosis of sprained ankle
Incomplete insurance information
Insurance ID does not match the established patter defined by the payer
Initial patient evaluation can not be performed on an established patient
Yearly exams cannot be performed more than once a year
Brain surgery cannot be performed on a patient in the office
Bundled procedure files
A particular payer requires Medical Records for payment of all pain management procedures In this embodiment, information in the rules engine or system would indicate that the payer would not pay. This ensures minimal payer denials. Given that there are approximately 10,000 procedure codes (CPT-4) and 16,000 diagnosis codes (ICD-9), the system and method of the invention may be used to streamline and enhance the process. Similarly, the system and method of the invention may be used to accommodate rules which vary by payer, region and place of service, for example. Other considerations are possible.

In one embodiment, rules engine or system 205 may ensure that receivables pass payer-specific rules validation prior to submission to the third-party payers, and thus: s collections are worked faster because rework and resubmission is minimized; lost charges may be minimized because most receivables are collected the first time they are submitted and are therefore not subject to the inefficiency and disorganization of a typical medical practice; improved compliance may be achieved with payer policies; and an assessment of true "claim value" may be made and subsequently applied to produce an actual forecast of collections.

Figure 10:
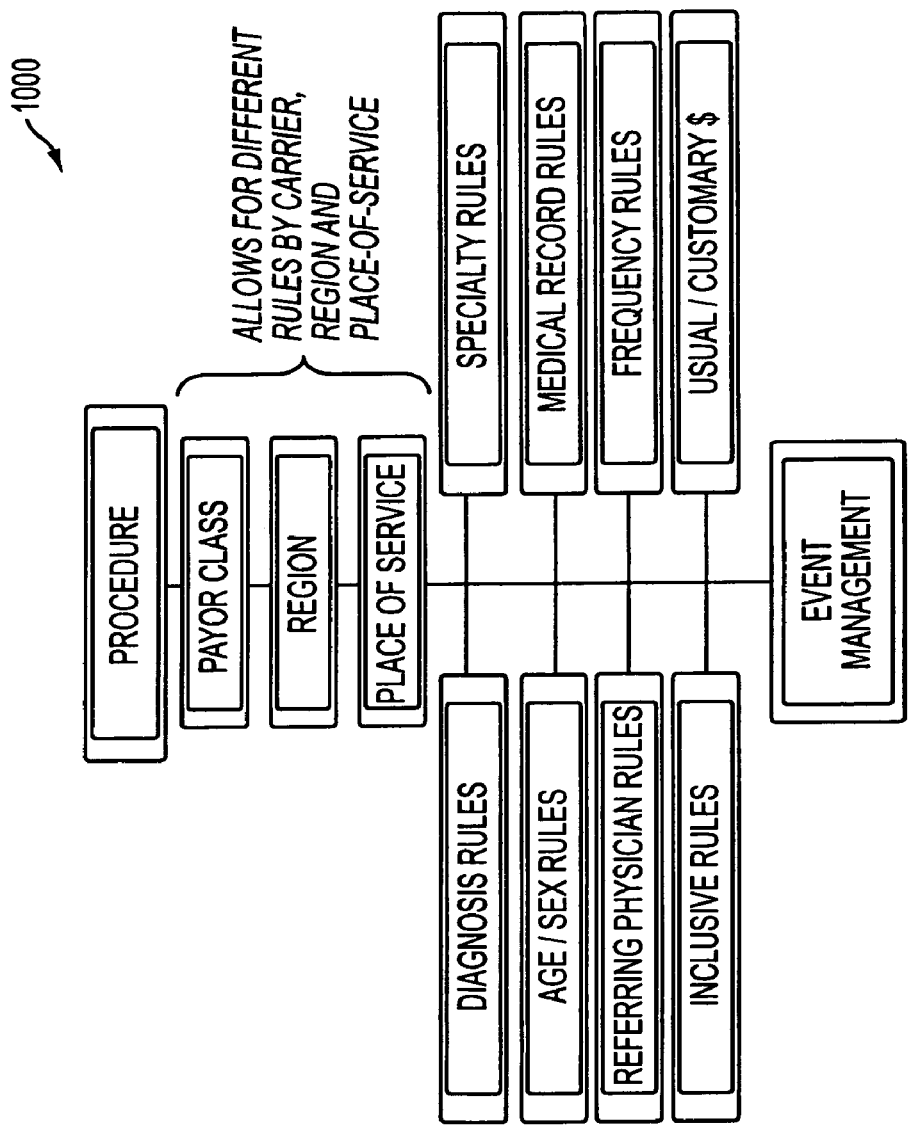
FIG. 10 illustrates one embodiment of a chart 1000 of rules hierarchy according to the present invention.

FIG. 10 illustrates a chart of one embodiment of a hierarchical rules structure 1000 according to the present invention. As shown, rules may be provided which relate to procedure, payer class, regions, place of service, diagnosis, age/sex, referring physician, inclusive, specialty, medical record, frequency, usual/customary $, and event management. In one embodiment, rules engine 205 may apply these rules, which may be maintained by a combination of content management staff and proprietary inference technology, against all encounters prior to their being delivered to the transaction processing engine or system 215. In other words, a physician's claim is not delivered to the payer until it has passed the Rules Validation Process. Rework is minimized and receivables days outstanding (DSO) is minimized, and as a result cash flow is optimized. Additionally, the rules system carries the usual and customary payment from the corresponding payer. The system and method of the invention subsequently carries these amounts at the receivable level, therefore enabling the customer to have visibility into his/her receivable in both an "amount billed" and "claim value" perspective.

Figure 11:
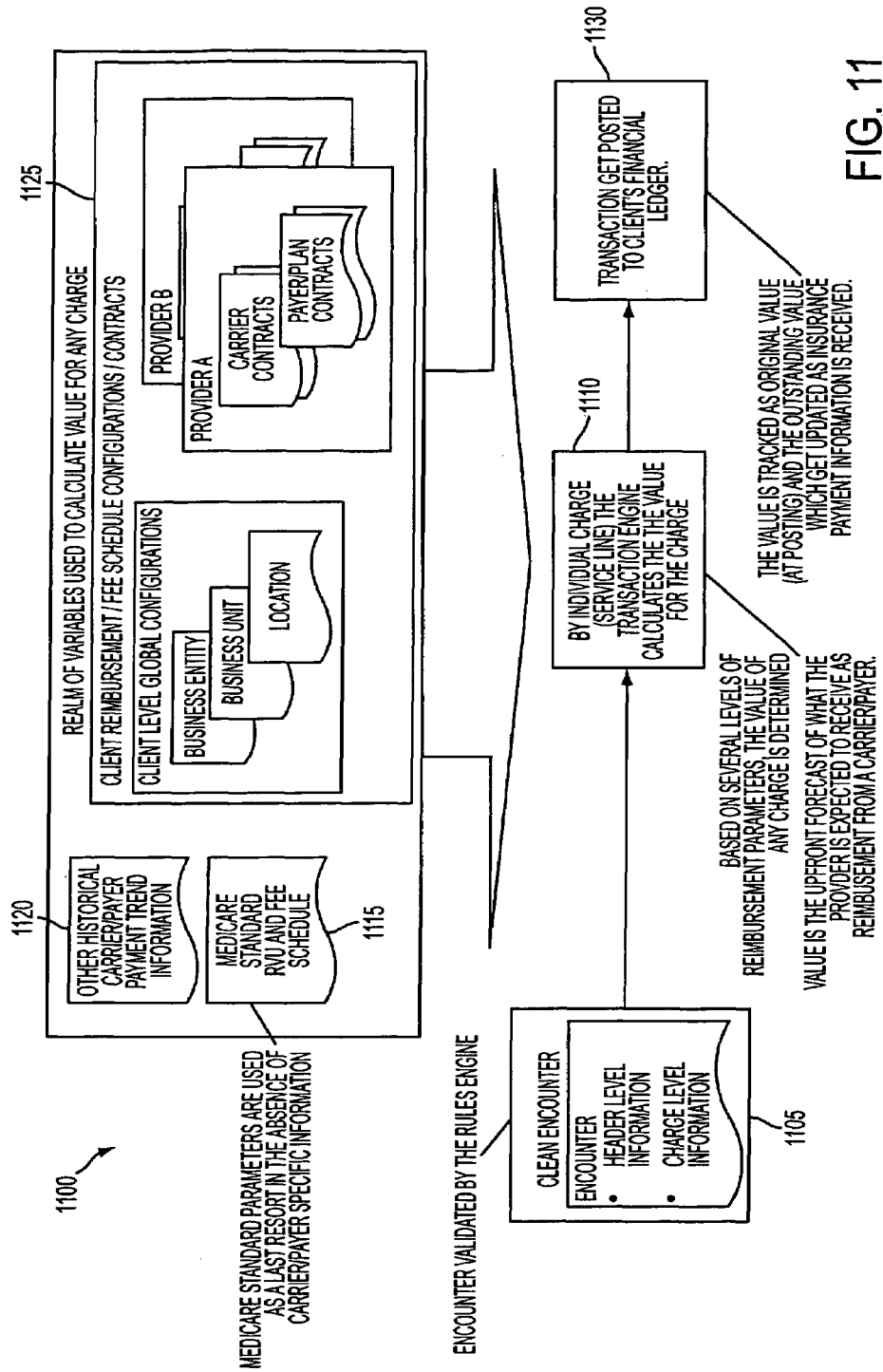
FIG. 11 illustrates one embodiment of a process flow diagram 1100 performed by the transaction engine or system of the present invention.
Figure 11A:
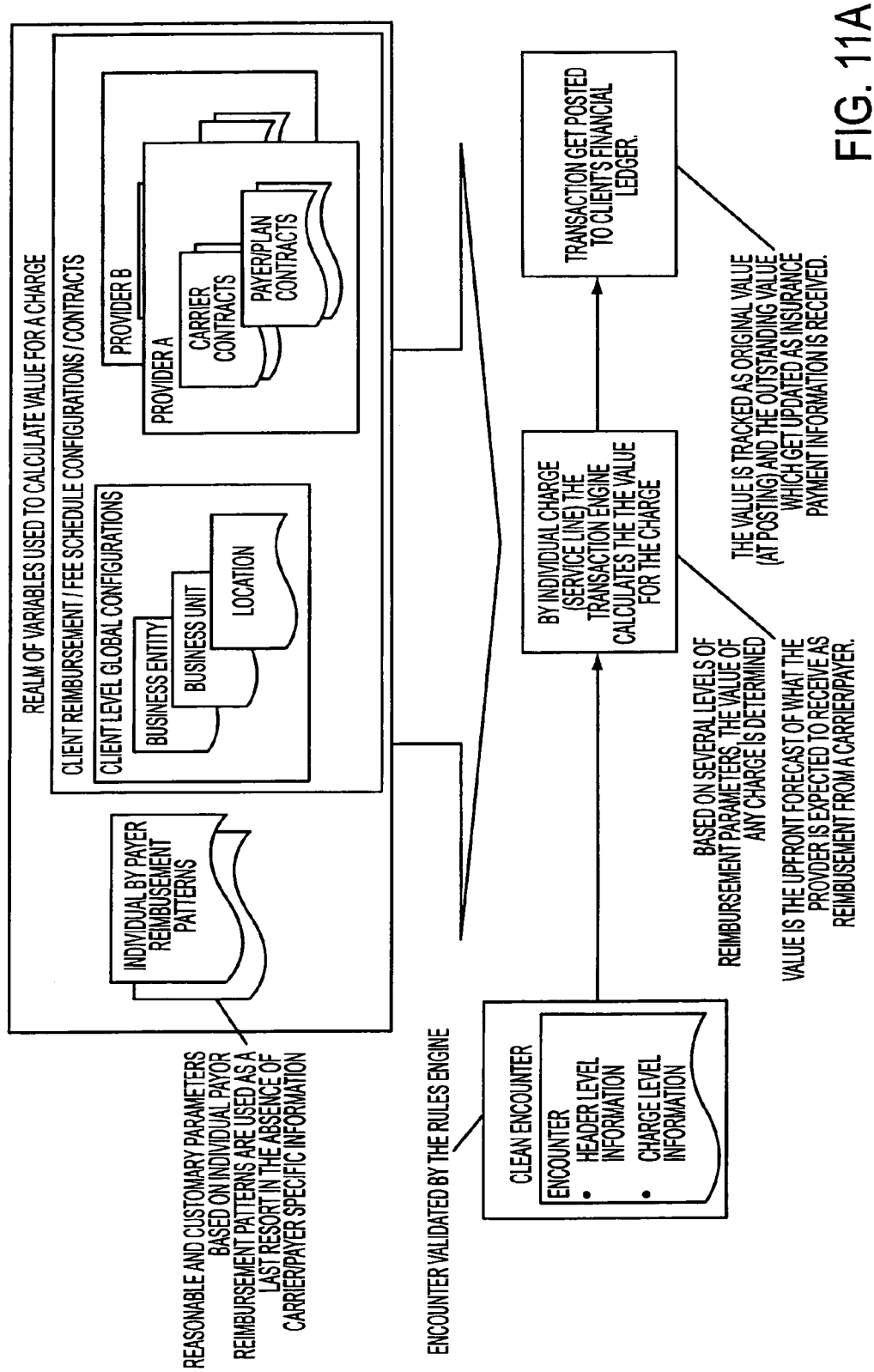

FIG. 11 illustrates one embodiment of a process 1100 which may be performed by transactions engine or system 215. In one embodiment, transaction processor engine or system 215 may determine a value associated with charges contained in an encounter, for example. At step 1105, an encounter that passes the rules evaluation stage (see FIG. 9) is received by the transaction processor engine or system 215. In one embodiment, the encounter contains header level information, charge level information, as well as other information inputted by the provider or collected through association of existing clinical or treatment information. At step 1110, the transaction processor engine or system 215 may calculate the value of an individual charge, i.e., the upfront forecast of what the provider is expected to receive as reimbursement from a the carrier/payer. In one embodiment, value may be determined based on several levels of reimbursement parameters and variables. Examples include, but are not limited to: client level global configurations, such as business entity, business unit, and location; provider-specific contracts, such as carrier contracts and payer/plan contracts; other historical payer payment trend information; and Medicare standard Relative Value Units (RVU) and fee schedules. In one embodiment, Medicare standard parameters may be used as a last resort in the absence of payer-specific information. At step 1130, the determined value(s) may be posted to the corresponding client's (e.g., provider's) financial ledger. In one embodiment, posted values may be tracked as original value (e.g. at the time of initial posting) and as outstanding value, which may get updated as payment information is received, for example. Once posted, claims may be sent to appropriate payers for payment.

Figure 12:
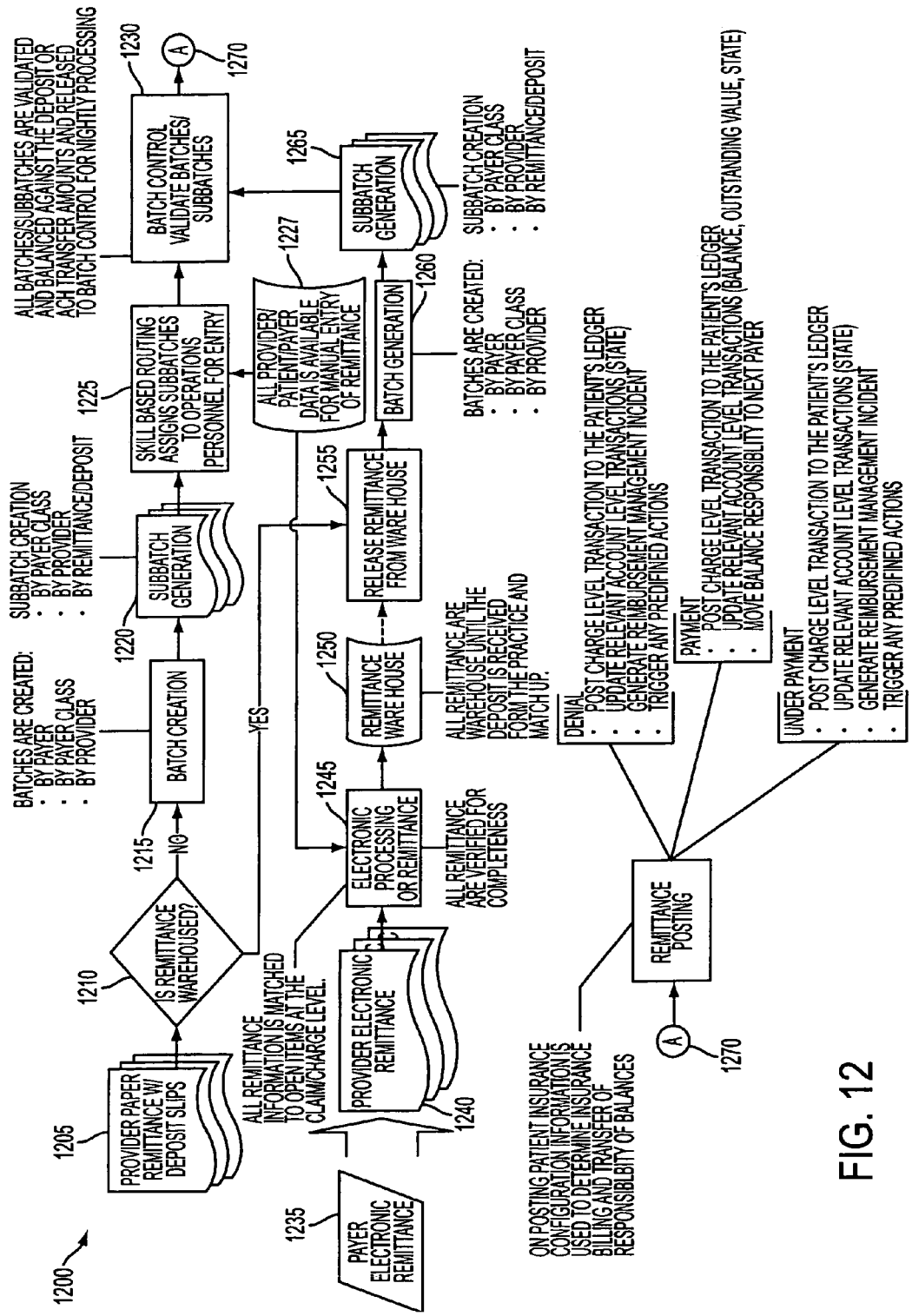
FIG. 12 illustrates one embodiment of a process flow diagram 1200 performed by the remittance processing engine or system of the present invention.

FIG. 12 illustrates one embodiment of a process 1200 which may be performed by remittance processor engine or system 225. Once a payer determines whether it will pay or deny a claim, or after a predetermined time if no response is received from the payer, remittance processor engine or system 225 begins to process remittances. Remittances may be received as paper batches or electronically, such as through stations 110, for example. At step 1205, an agent of system 200, for example, may receive a batch of provider paper remittances with deposit slips. At step 1210, a determination is made whether a specific remittance received has been previously warehoused. If it has, the particular remittance may be released from the warehouse, at step 1255, and subsequently generated into batches and sub-batches, and validated, as indicated at steps 1260, 1265, and 1230, and ultimately posted, as indicated at step 1270. If, however, the remittance has not been warehouses, at step 1215 a batch is created, which may be done by payer, payer class, and/or by provider to facilitate an efficient and ordered set of work. Next, at step 1220, a sub-batch may be generated, such as by payer class, by provider, and/or by remittance/deposit. At step 1225, routing of batches may be performed to the most qualified resources based on skills based routing and utilization. At step 1227, provider/patient/payer data and information may be entered into a remittance, if desired.

In one embodiment, routing may be skill-based, which may involve sending batches to specific staff or agents of the system 200 administrator, clients, partner organizations and/or payers, for example. Staff may include payer specialists, coding specialists, and account managers. Partners may include specific collectors who work claims. Clients may have office managers, office billers, and clinicians, for example, that work collections. Once batches are routed, they may be validated as shown at step 1230. In one embodiment, all batches and sub-batches may be validated and balanced against the deposit or Automated Clearing House (ACH) transfer amounts and released to batch control for nightly processing. At step 1270, remittances are posted.

If remittances are submitted electronically, such as by station 110 at step 1235 and 1240, for example, at step 1245 they are processed and verified for completeness. Processing may involve matching remittance information to open items at the claim/charge level, for example. Provider/patient/payer information is available for manual may be entry of remittance. Next, at step 1255, the remittance is warehoused. In one embodiment, a remittance may be warehoused until a deposit is received from the practice and match-up, for example. At step 1255, a remittance is released from warehouse and subsequently generated into batches and sub-batches, and validated, as indicated at steps 1260, 1265, and 1230, and ultimately posted, as indicated at step 1270.

At step 270, remittance posting occurs. Remittance posting may, in one embodiment, use patient insurance configuration information to determine insurance billing and transfer of responsibility of balances. Posted remittances may comprise, for example, a denial, a payment, no-response, and an underpayment, for example. With a denial remittance, the following may occur: post charge level transactions to the patient's ledger; update relevant account level transactions; generate reimbursement management incident(s); and trigger any predefined actions. A payment remittance may result in: post charge level transaction to the patient's ledger; update relevant account level transactions (e.g., balance, outstanding value, state); and move balance responsibility to the next payer. Under payment may involve: post charge level transaction to the patient's ledger; update relevant account level transactions (state); generate reimbursement management incident(s); and trigger any predefined actions.

In one embodiment, posting of the full remittance (e.g., payments and denials) may result in: correct third-party payer reimbursement and adjudication practices that can be tracked and reacted to; tracking and communicating of receivable history to all interested clients; comparing of reimbursement amounts against pre-assessed value to detect underpayments, for example; the ability to learn from real responses, in real time—for instance, each denial that occurs, is an opportunity to create a new rule in the Rules system to prevent the denial from happening again.

Figure 13:
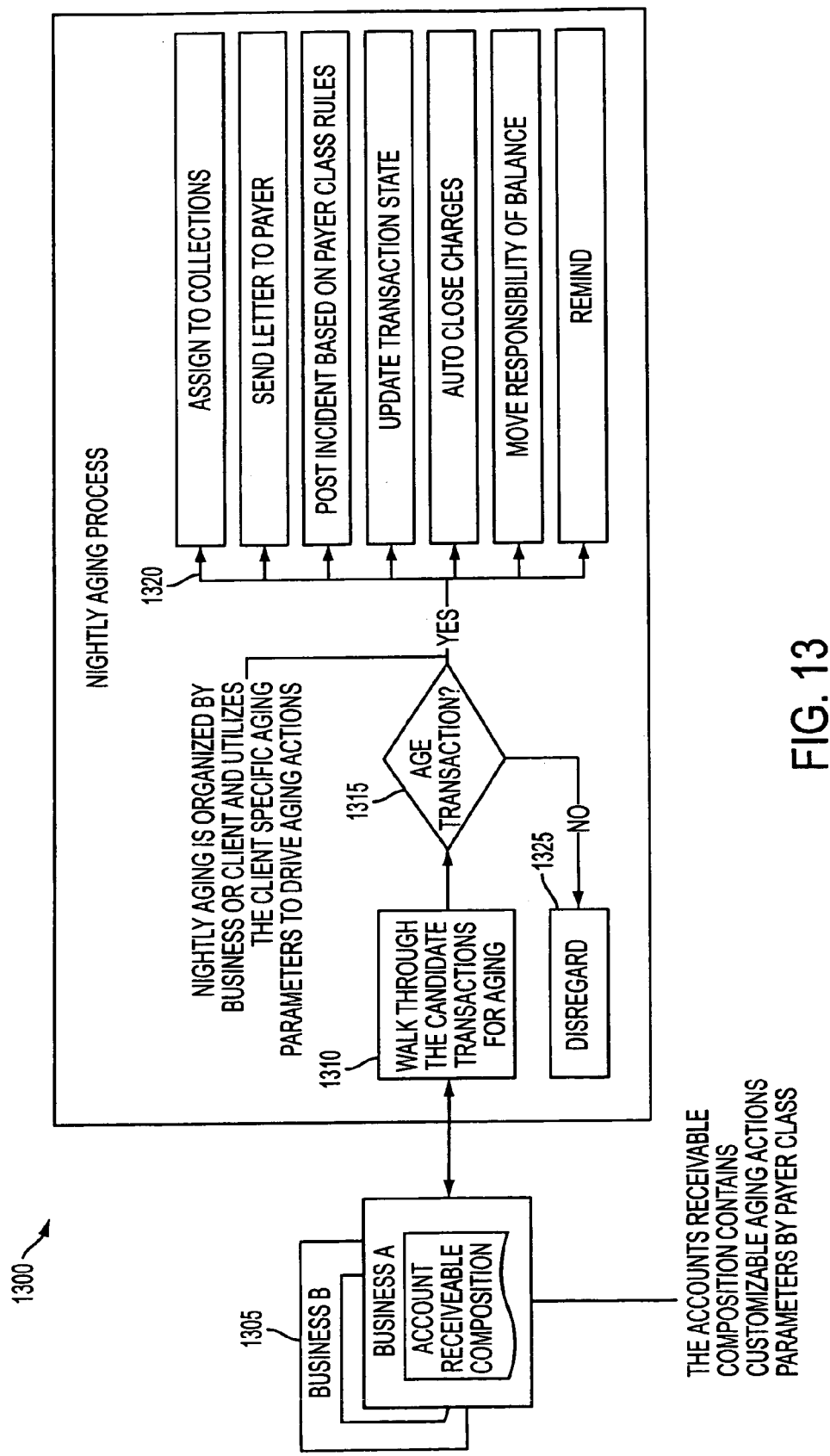
FIG. 13 illustrates one embodiment of a process flow diagram 1300 performed by the nightly aging engine or system of the present invention.

FIG. 13 illustrates one embodiment of a process 1300 which may be performed by nightly aging engine or process 235. At step 1305, account receivable compositions are received. In one embodiment, they may be received from the remittance process engine or system 225, or from database 140, for example. In another embodiment, accounts receivable composition may contain customizable aging action parameters by payer class, for example. At step 1310, the candidate transactions a walked through for aging. At step 1315, a determination is made whether the transaction must be aged. If it is not, the transaction is disregarded and the next transaction is considered. If it is, at step 1320, aging engine may: assign account to collections; send letter to payer; post incident based on payer class rules; update transaction state; auto close charges; move responsibility of balance; and set reminder. In one embodiment, nightly aging may be organized by business or client and may utilize the client specific aging parameters to drive aging actions.

In one embodiment, aging of receivables by nightly aging engine or system 235 may: identifies potential problem receivables (lost in mail, ignored by insurance company, pending, etc.) at the earliest possible opportunity so that collectors may begin working; and allow the system and method of the invention to create automated responses to certain events (i.e. automatic letter generation, resubmission of claim, electronic claim status) rather than human responses, which are more time consuming and costly.

Figure 14:
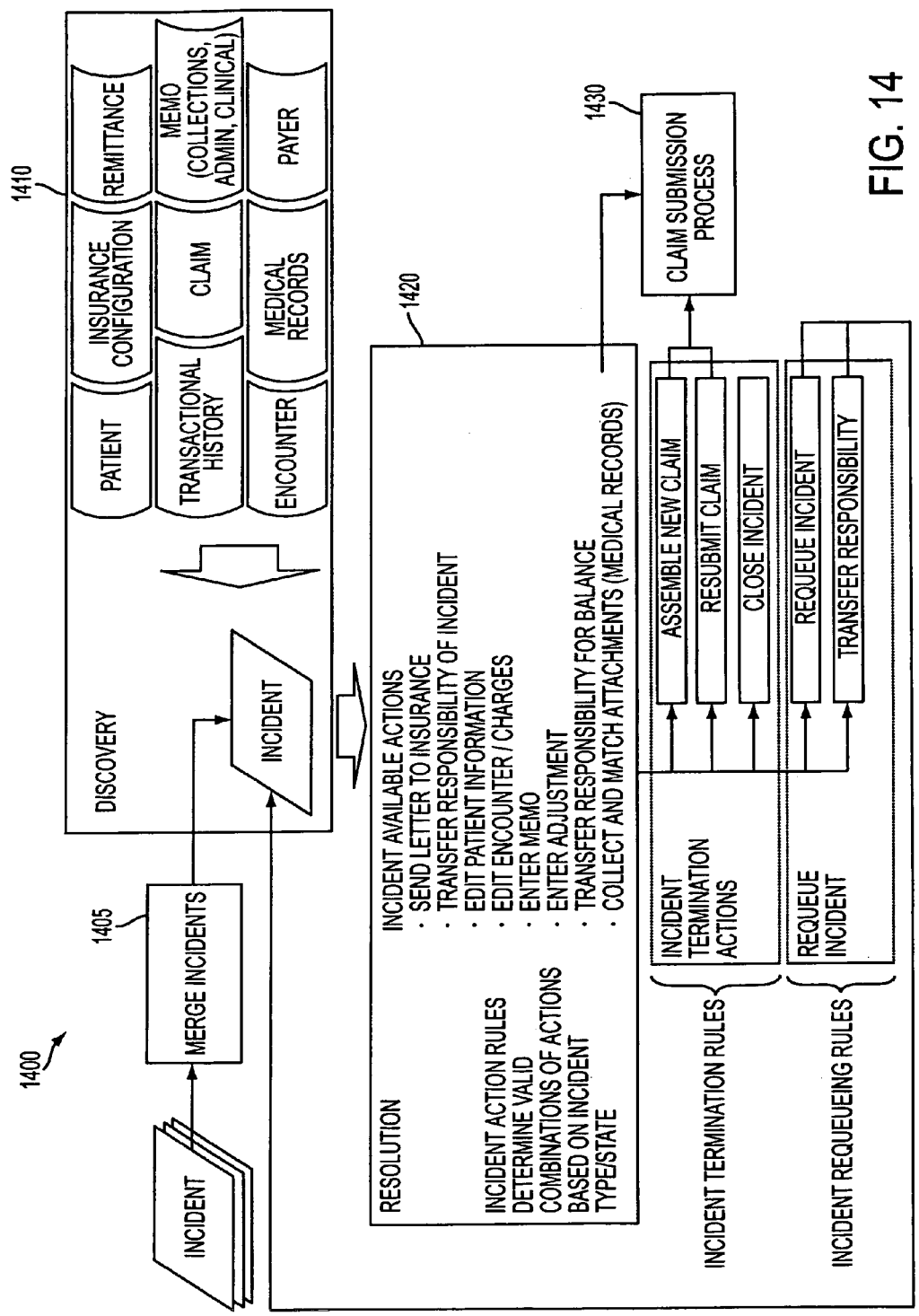
FIG. 14 illustrates one embodiment of a process flow diagram 1400 performed by the reimbursement management engine or system of the present invention.

FIG. 14 illustrates one embodiment of a process 1400 which may be performed by reimbursement management engine or system 235. At step 1405, all incidents coming in from aging engine 235 and reimbursement processing engine 225 are merged in a particular order for further collections work. At step 1410, additional information may be appended to the ordered incidents to enhance the collections process. Additional information may include, for example, patient information, insurance configuration, remittance information, transactional history, claim information, memoranda (e.g., collections, administrative, and clinical), encounter information, medical records information, an payer. Other information may be added.

Next, at step 1420, incidents may be resolved based on incident type and/or state, for example. Available resolutions/actions include: sending letter to payer; transfer responsibility of incident; editing of patient information; editing of encounter information and charges; entering memoranda; entering adjustments; transfer responsibility of balance; and collect and match attachments (e.g. medical records). Next, a new claim may be assembled; a claim may be resubmitted, and an incident may be closed. These may be referred to as incident termination actions, which are then passed to the claim submission process as shown in step 1430. Also, an incident may be re-queued or responsibility may be transferred. These may be referred to as incident re-queuing rules. In these cases, the re-queued incident may be sent back to step 1410 for further processing, as shown.

In one embodiment, reimbursement management engine or system may: organize collection tasks in an efficient manner; allow collectors to utilize the system on multiple incidents at once; provide tools to document and collect on receivables; provide a mechanism for quantifying outstanding collection issues; and provide a mechanism for all clients (e.g., all parties involved in the collections process) to interact. In one embodiment, reimbursement management engine or system may interface with or be accessed by a collections staff, for example, to carry out collections work.

Figure 15:
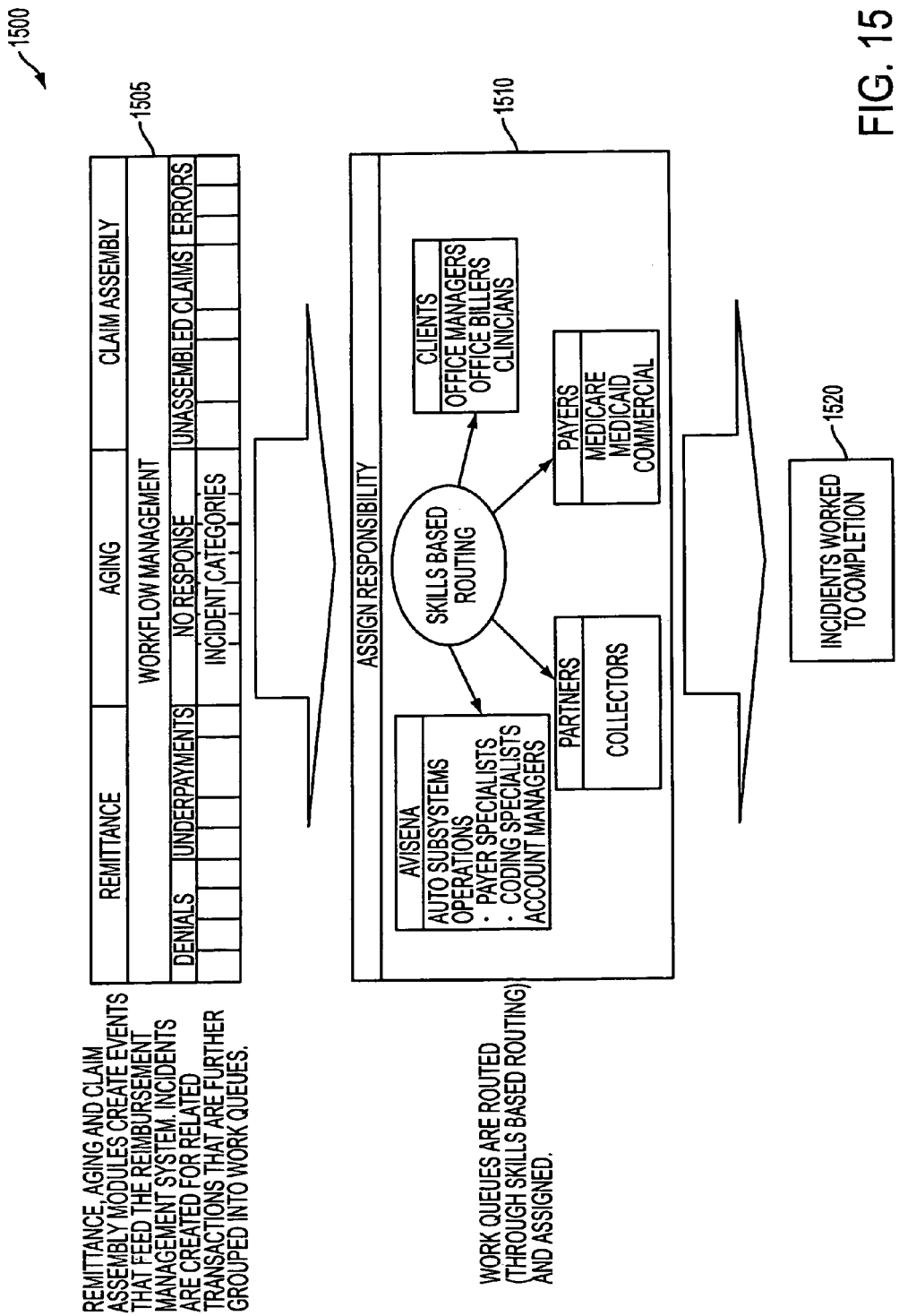
FIG. 15 illustrates one embodiment of a process flow diagram 1500 performed by the system and method of the invention.

FIG. 15 illustrates one embodiment of a process 1500 which may be performed by the system and method of the invention. As shown in step 1505, remittance, aging, and claim assembly take place. In one embodiment, management of incidents may reveal denials, underpayments, no response, unassembled claims, and errors, for example. Other incidents are possible. In one embodiment, remittance, aging and claim assembly modules create events that feed the reimbursement engine or system 230. Incidents may be created for related transactions that may further be grouped into work queues, for example. At step 1510, work queues are assigned/routed. In one embodiment, assignment is done through skills based routing, such as to staff of administrator of system 200, partners, payers, and clients, for example. At step 1520, the incidents are worked to completion. In another embodiment, skills-based routing and may: automates the assignment of work to the staff and client resources; track incidents and ensure that they are dealt with in a timely fashion; provide alerts and escalation paths for incidents that are not being dealt with; and allow for tracking and reporting of productivity of resources both in staff and at the client sites.

Figure 15A:
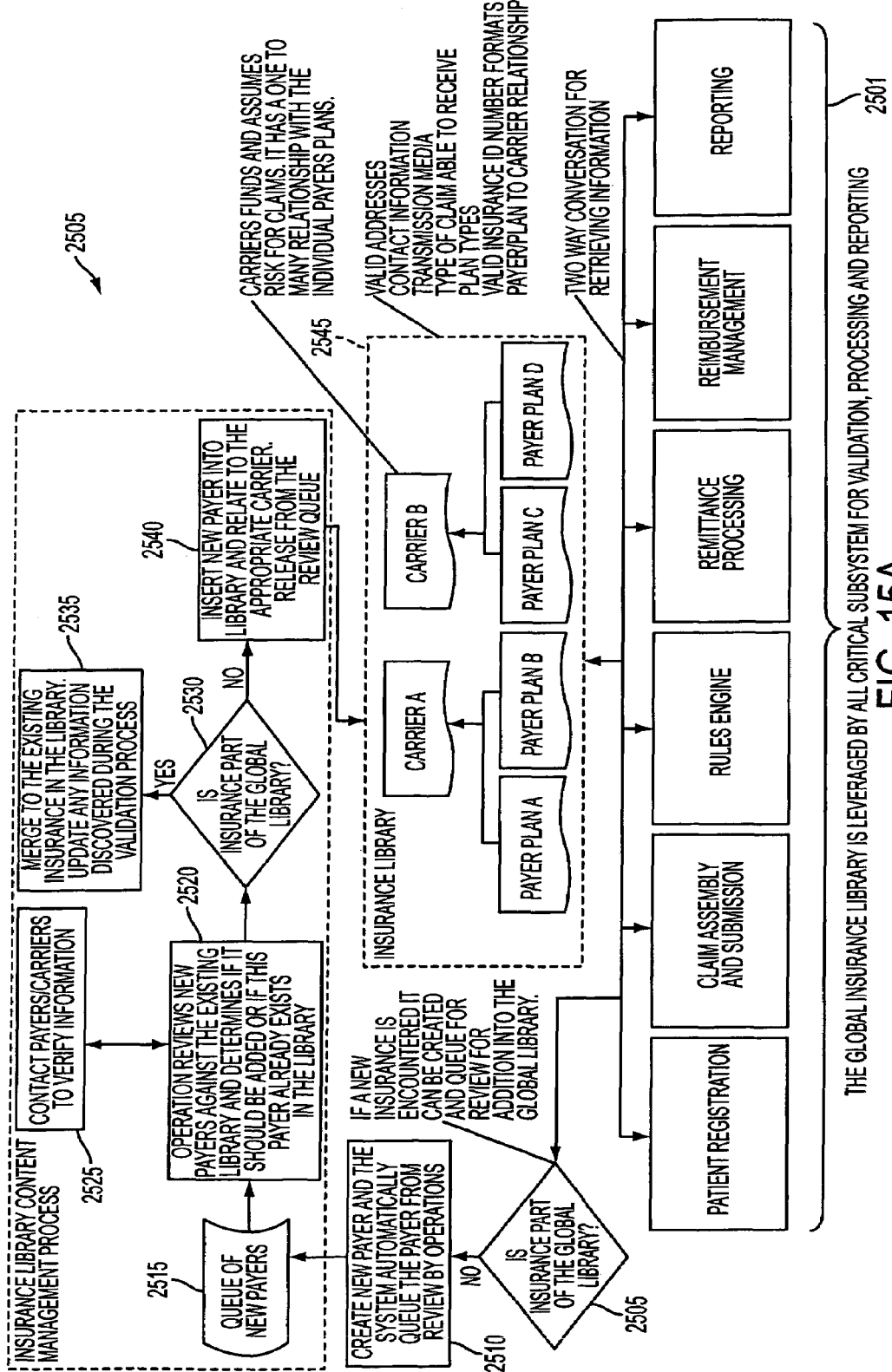
FIG. 15a illustrates one embodiment of a process flow diagram 2500 for creating and maintaining a global insurance library.

FIG. 15a illustrates one embodiment of a method for creating and maintaining a global insurance library that, in one embodiment, maintains relevant insurance information. At step 2505, a determination is made whether new insurance is encountered by any of the system or engines running in 2501, i.e., patient registration, claim assembly and submission, rules engine, remittance processing, reimbursement management, and reporting, and whether the new insurance is part of library 2545. If not, then at step 2510 a new payer, for example, may be created and the system may automatically queue the new payer for review by an operations staff, for example. At steps 2515, 2520, operations staff reviews new payer information against the existing library and determines if it should be added or if the payer already exists in the library 2545. In one embodiment, the operations staff may contact payers/carriers to verify information, as shown at step 2525. At step 2530, a determination is made as whether the new insurance is part of library 2545. If yes, the new information is merged to the existing insurance in the library discovered during the validation process, as shown at step 2535. If no, at step 2540, the payer information is inserted to the library and related to the appropriate carrier, for example. In one embodiment, the payer is released from the review queue. Library 2545 may store information on a per-carrier or per-payer basis, for example. In one embodiment, library 2545 is associated with database 140, for example. In another embodiment, the method and process of FIG. 15a may be performed by any module, engine or system associated with system 200, and may be accessed by any of the modules, engines or systems disclosed herein. That is, any of these engines or systems may enable two-way communication for the retrieval and input of information.

Figure 16:
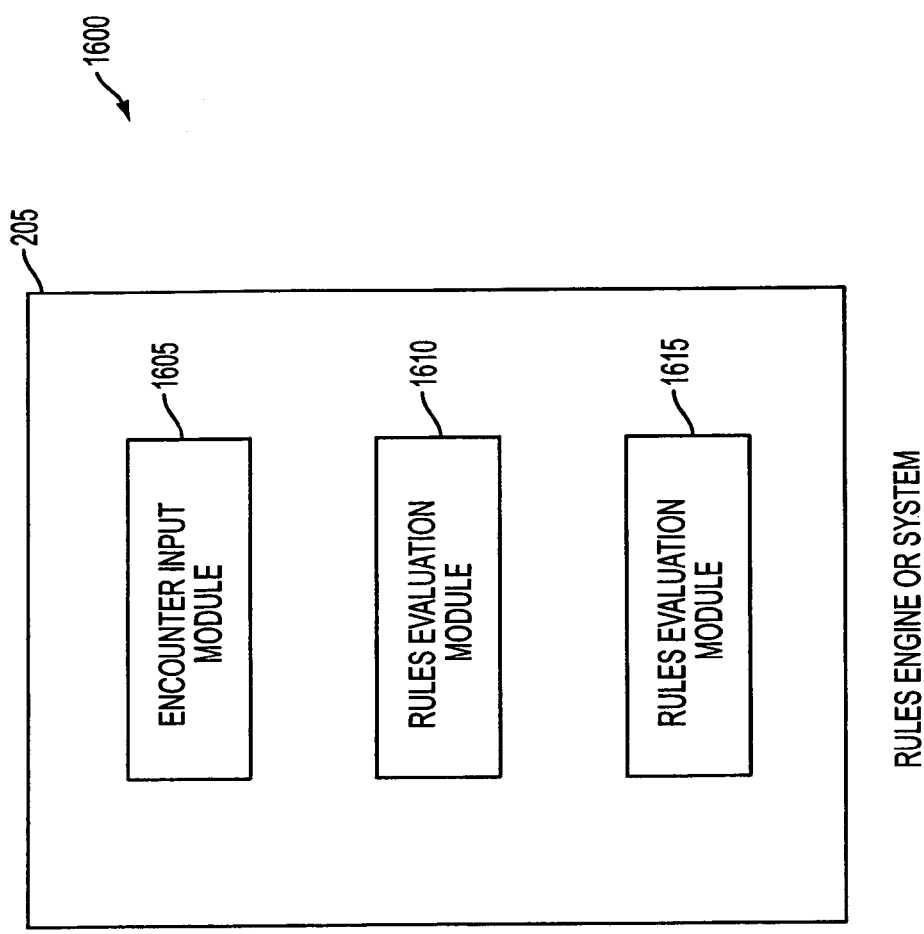
FIG. 16 illustrates one embodiment of a rules engine or system 205 of the present invention.

FIG. 16-20 illustrate block diagrams disclosing modules which may perform the various steps described and disclosed herein. For example, FIG. 16 illustrates one embodiment of a rules engine or system 205 having an encounter input module 1605, a rules evaluation module 1610, and a posting module 1615. In one embodiment, encounter input module 1605 may be accessed by a client using station 110 to input encounter information into system 200. In another embodiment, rules evaluation module 1610 may process the encounter information inputting using the method 900 disclosed in FIG. 9. In another embodiment, posting module 1615 may post to transaction processing engine or system 215, as shown at step 930 of FIG. 9.

Figure 17:
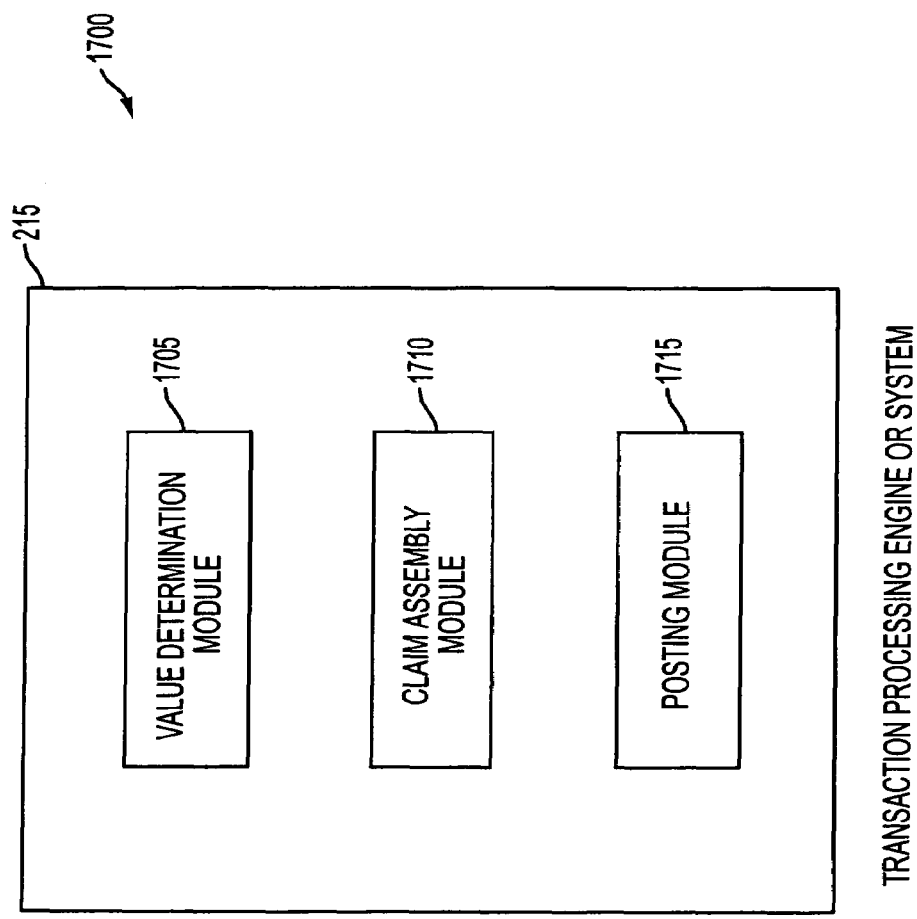
FIG. 17 illustrates one embodiment of a transaction processing engine or system 215 of the present invention.

FIG. 17 illustrates one embodiment of a transaction processing engine or system 215 having a value determination module 1705, a claim assembly module 1710, and a posting module 1715. In one embodiment, value determination module 1705 may be perform the steps and functions disclosed herein relating to valuation of charges, such as that disclosed in FIG. 11, for example. In another embodiment, claim assembly module 1710 may assemble claims as described in FIG. 3, for example. In another embodiment, a posting module 1715 may be used to post to a client's financial ledger, as shown in FIG. 11, for example.

Figure 18:
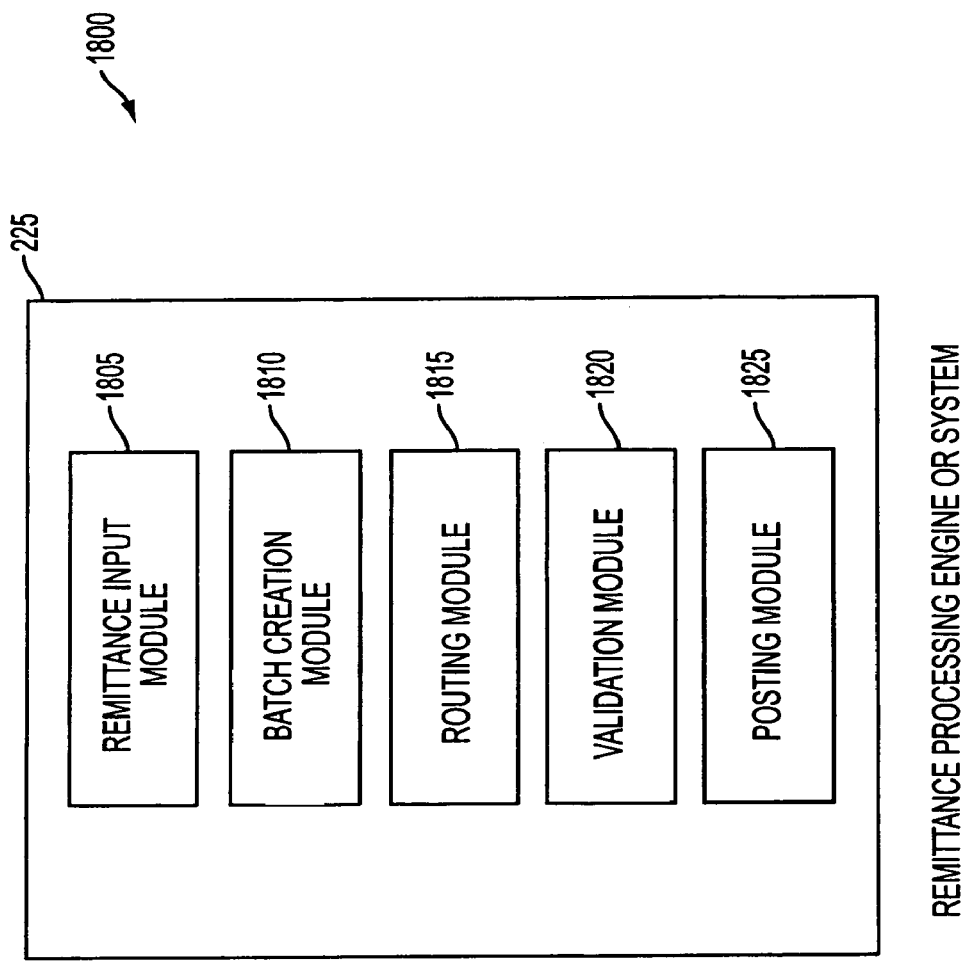
FIG. 18 illustrates one embodiment of a remittance processing engine or system 225 of the present invention.

FIG. 18 illustrates one embodiment of a remittance processing engine or system 225 having a remittance input module 1805, a batch creation module 1810, a routing module 1815, a validation module 1820, and a posting module 1825. In one embodiment, remittance input module 1805 may be used to receive remittances from a payer, for example. Remittance input module 1805 may receive remittances electronically directly from the payer using station 110, or may be inputted by an agent of the administrator of system 200, for example. In another embodiment, batch creation module 1810, a routing module 1815, a validation module 1820, and a posting module 1825 all perform the respective functions and steps disclosed in FIG. 12, for example.

Figure 19:
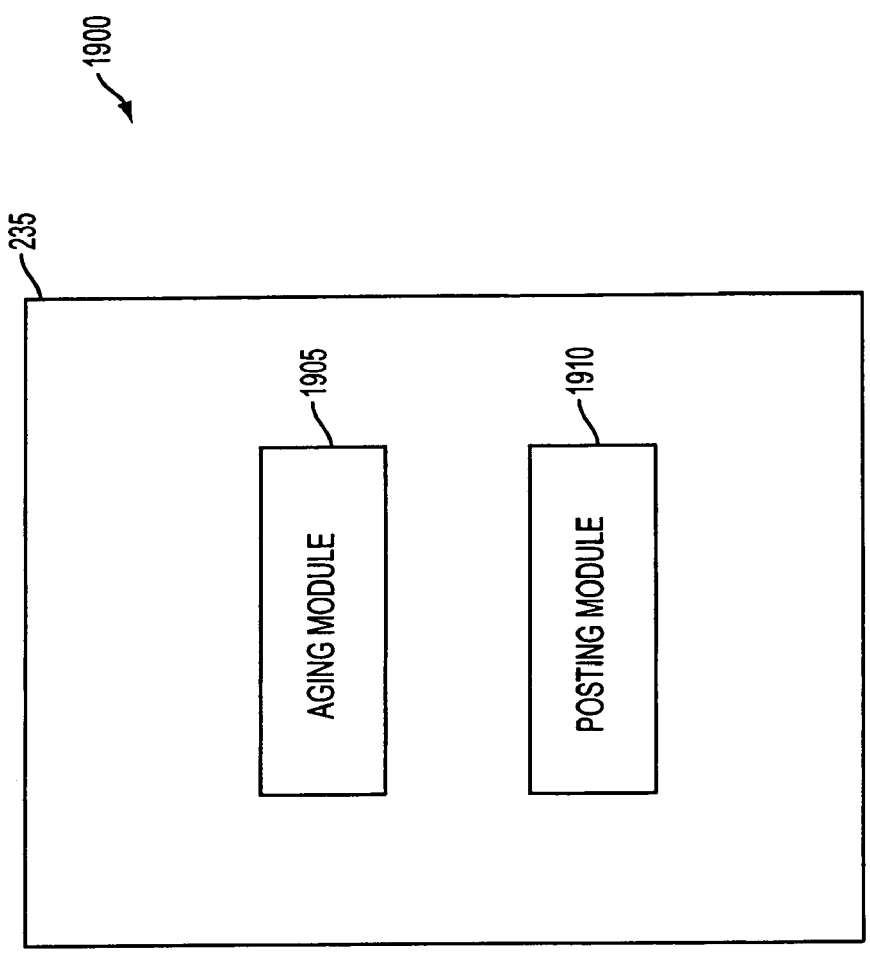
FIG. 19 illustrates one embodiment of a nightly aging engine or system 235 of the present invention.

FIG. 19 illustrates one embodiment of a nightly aging engine or system 235 having an aging module 1905 and a posting module 1910. In one embodiment aging module 1905 may be used to perform the steps and functions disclosed in FIG. 13 relating to aging of individual incidents, for example. In another embodiment posting module 1910 may be used to post incidents as indicated in FIG. 13, for example.

Figure 20:
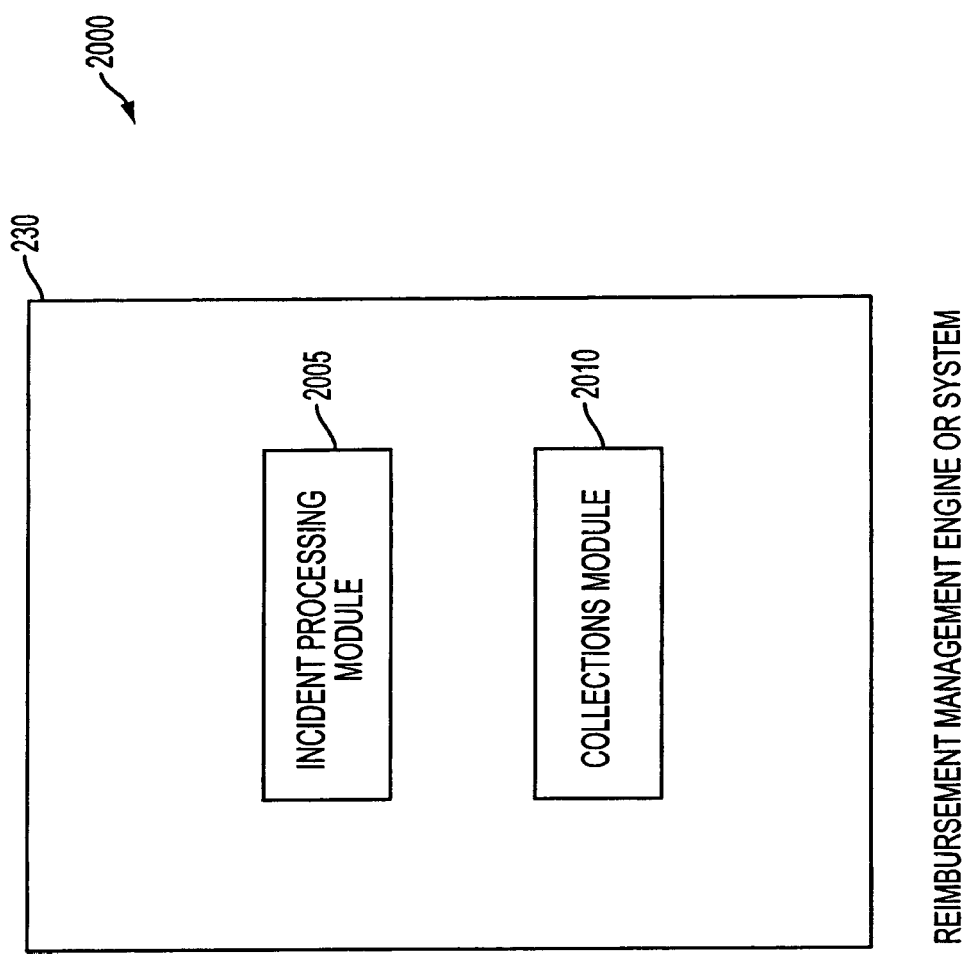
FIG. 20 illustrates one embodiment of a reimbursement management engine or system 230 of the present invention.

FIG. 20 illustrates one embodiment of a reimbursement management engine or system 230 having an incident processing module 2005 and a collections module 2010. In one embodiment, incident processing module 2005 may perform the functions and steps disclosed in FIG. 14 which relate to processing of incidents, such as step 1410, for example. In another embodiment, collections module 2010 may be accessed to perform various collection steps, such as incident actions disclosed in step 1420, for example.

Although FIGS. 16-20 respectively disclose a specific number of modules, one of ordinary skill in the art will appreciate that the functions and features described herein may be performed by a greater or lesser number of modules.

For example, a single module may be used to perform all the functions and features described and disclosed herein. Similarly, the engines and/or systems discussed and claimed herein may also be performed by any number of modules programmed to achieve the same functionality.

The present invention is described in relation to a system and method for managing health care accounts receivable. Nonetheless, the characteristics and parameters pertaining to the system and method may be applicable to management of accounts receivable associated with other types of content and/or industries.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system for managing account receivables, comprising:
a rules module or engine receiving at last one encounter from a first party and assessing the at least one encounter based on rules associated with a payer;
a transaction module or engine: (1) converting the at least one encounter to at least one claim; (2) providing the first party with an estimated value of the at least one claim to the payer, wherein the estimated the value comprises an estimated payment amount that the first party is likely to receive as payment from the payer for services rendered, and wherein the estimated payment is determined from corresponding historical and current payment patterns of the payer, and (3) outputting the at least one claim to the payer based on the rule module's assessment of the at least one encounter;
a remittance processing module or engine: (1) receiving and processing at least one remittance from the payer, wherein the at least one remittance comprises at least one payment on the at least one claim, (2) comparing the at least one payment to the estimated value of the at least one claim, (3) posting the at least one payment against the at least one claim, (4) generating an underpayment incident if the estimated value is more than the at least one payment, wherein the underpayment incident comprises the difference between the estimated value and the at least one payment; (5) revising the estimated value if the at least one payment is greater than the estimated value, and (6) posting the underpayment incident as a denial to a reimbursement management module or engine for collection.

2. The system of claim 1, where in the rule module's assessment comprises posting the at least one encounter to a transaction table.

3. The system of claim 1, wherein the rules module or engine rejects the at least one encounter if it does not comply with the rules associated with the payer.

4. The system of claim 1, wherein the at least one remittance further comprises at least one denial, wherein the at least one denial is posted to the reimbursement management module or engine for collection.

5. The system of claim 1, further comprising a nightly aging module or engine for aging accounts receivables on a nightly basis.

6. The system of claim 4, reimbursement management module or engine organizes the at least one denial into an efficient configuration.

7. The system of claim 6, wherein the reimbursement management module or engine further assesses at least one of a denial incident, a no-response incident, an underpayment incident, and a patient past due incident.

8. An automated method for managing accounts receivables, wherein the method is executed by a programmed computer processor which communicates with a user via a network, the method comprising the steps of:
posting an encounter to a transaction table using the programmed computer processor, wherein the encounter is submitted by a user via the network;
processing the encounter using the programmed computer processor to determine an estimated value amount from a payer, wherein the estimated value comprises estimated payment amount that the first party is likely to receive as payment from the payer for services rendered, and wherein the estimated payment is determined from corresponding historical and current payment patterns of the payer;
presenting a first claim and second claim based on the encounter to the payer;
receiving a remittance from the payer, wherein the remittance comprises a payment on the first claim and a denial of the second claim;
comparing the remittance to the estimated payment using the programmed computer processor; and
posting the remittance to the transaction table using the programmed computer processor, wherein the payment on the first claim is applied against the first claim and the denial of the second claim is submitted to a reimbursement management engine for collection.

9. An automated method for managing account receivables, wherein the method is executed by a programmed computer processor which communicates with a first party via a network, the method comprising the steps of:
receiving at least one encounter from a first party via the network, wherein the at least one encounter relates to services rendered by the first party;
assessing the at least one encounter based on rules associated with a payer;
converting the at least one encounter to at least one claim using the programmed computer processor;
determining an estimated value of the at least one claim to the payer using the programmed computer processor, wherein the estimated value comprises an estimated payment amount that the first party is likely to receive as payment from a payer for services rendered, and wherein the estimated payment is determined from corresponding historical and current payment patterns of the payer;
outputting the at least one claim to the payer;
receiving at least one remittance from the payer, wherein the at least one remittance comprises at least one payment on the at least one claim;
comparing the at least one payment to the estimated value of the at least one claim;
posting the at least one payment against the at least one claim;
generating an underpayment incident if the estimated value is more than the at least one payment, wherein the underpayment incident comprises the difference between the estimated value and the at least one payment;
revising the estimated value if the at least one payment is greater than the estimated value; and
posting the underpayment incident as a denial for collection.

10. The automated method of claim 9, wherein the comparison step occurs after the payment is received.

* * * * *